United States Patent
Shi et al.

(10) Patent No.: US 11,363,609 B2
(45) Date of Patent: Jun. 14, 2022

(54) METHODS, APPARATUS AND SYSTEMS FOR PREEMPTING UPLINK TRANSMISSION RESOURCE IN A WIRELESS COMMUNICATION

(71) Applicant: ZTE CORPORATION, Guangdong (CN)

(72) Inventors: Jing Shi, Shenzhen (CN); Shuqiang Xia, Shenzhen (CN); Chunli Liang, Shenzhen (CN); Xianghui Han, Shenzhen (CN); Min Ren, Shenzhen (CN); Wei Lin, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 17/035,520

(22) Filed: Sep. 28, 2020

(65) Prior Publication Data

US 2021/0014866 A1 Jan. 14, 2021

Related U.S. Application Data

(63) Continuation of application No. PCT/CN2018/082019, filed on Apr. 4, 2018.

(51) Int. Cl.
| | |
|---|---|
| *H04W 72/04* | (2009.01) |
| *H04L 1/00* | (2006.01) |
| *H04L 5/00* | (2006.01) |
| *H04L 25/02* | (2006.01) |
| *H04W 24/08* | (2009.01) |

(Continued)

(52) U.S. Cl.
CPC ....... *H04W 72/0493* (2013.01); *H04L 1/0013* (2013.01); *H04L 5/0051* (2013.01); *H04L 25/0226* (2013.01); *H04W 24/08* (2013.01); *H04W 56/0045* (2013.01); *H04W 72/0446* (2013.01); *H04W 72/14* (2013.01); *H04W 80/08* (2013.01)

(58) Field of Classification Search
None
See application file for complete search history.

(56) References Cited

U.S. PATENT DOCUMENTS

| | | | |
|---|---|---|---|
| 2018/0035332 A1 | 2/2018 | Agiwal et al. | |
| 2018/0278454 A1* | 9/2018 | Islam | H04L 27/2655 |

(Continued)

FOREIGN PATENT DOCUMENTS

| | | |
|---|---|---|
| CN | 106961741 A | 7/2017 |
| JP | 2021-513797 A | 5/2021 |
| WO | WO-2019/160969 A1 | 8/2019 |

OTHER PUBLICATIONS

Extended European Search Report on EP 18913662.5 dated Mar. 12, 2021 (6 pages).

(Continued)

*Primary Examiner* — Otis L Thompson, Jr.
(74) *Attorney, Agent, or Firm* — Foley & Lardner LLP

(57) ABSTRACT

Methods, apparatus and systems for preempting uplink transmission resource in a wireless communication are disclosed. In one embodiment, a method performed by a wireless communication device is disclosed. The method comprises: receiving indication information, wherein the indication information indicates that a first resource region is at least partially preempted; and cancelling or stopping or puncturing an uplink transmission based on the indication information.

14 Claims, 7 Drawing Sheets

(51) Int. Cl.
*H04W 56/00* (2009.01)
*H04W 72/14* (2009.01)
*H04W 80/08* (2009.01)

(56) References Cited

U.S. PATENT DOCUMENTS

| | | | | |
|---|---|---|---|---|
| 2018/0324816 | A1* | 11/2018 | Islam | H04W 72/14 |
| 2019/0082431 | A1* | 3/2019 | Yl | H04W 72/042 |
| 2019/0297638 | A1* | 9/2019 | Park | H04L 5/0044 |
| 2019/0306801 | A1* | 10/2019 | Zhou | H04W 52/04 |
| 2019/0306848 | A1* | 10/2019 | Zhou | H04W 72/042 |
| 2019/0320458 | A1* | 10/2019 | Hosseini | H04W 72/14 |
| 2020/0137736 | A1* | 4/2020 | Du | H04L 5/0053 |
| 2020/0288441 | A1* | 9/2020 | Park | H04W 72/04 |
| 2020/0344034 | A1* | 10/2020 | Moon | H04W 72/02 |

OTHER PUBLICATIONS

Lg Electronics: "Discussion on multiplexing UL transmission with different requirements", 3GPP Draft; RI-1802228; 3GPP TSG RAN WG1 Meeting #92, Athens, Greece, Feb. 26-Mar. 2, 2018 (6 pages).
Institute for Information Industry (III): "Considerations for UCI for URLLC" 3GPP TSG RAN WGJ Meeting 91 R1- 1720840, Dec. 1, 2017 (Dec. 1, 2017), Reno, USA (4 pages).
International Search Report and Written Opinion for PCT Appl. No. PCT/CN2018/082019 dated Dec. 29, 2018 (6 pages).
VIVO: "Multiplexing data with different transmission durations" 3GPP TSG RAN WGJ Meeting AH 1801 R1-1800205, Jan. 26, 2018 (Jan. 26, 2018, Vancouver, Canada (6 pages).
First Office Action for JP Appl. No. 2020-554273, dated Oct. 12, 2021 (with English translation, 10 pages).
Samsung: "Multiplexing of UL Transmissions with Different Reliability Requirements" 3GPPTSG RAN WG1 Meeting #92; R1-1802002; Mar. 2, 2018; Athens, Greece (8 pages).
First Office Action for KR Appl. No. 10-2020-7031651, dated Mar. 16, 2022 (with English translation, 11 pages).
Huawei et al., "Remaining aspects on pre emption indication for DL multiplexing of URLLC and eMBB" 3GPP TSG RAN WG1 Meeting #91, R1-1721452, Dec. 1, 2017, Reno, USA (11 pages).

* cited by examiner

METHODS, APPARATUS AND SYSTEMS FOR PREEMPTING UPLINK TRANSMISSION RESOURCE IN A WIRELESS COMMUNICATION

CROSS-REFERENCE TO RELATED APPLICATION

This application claims the benefit of priority under 35 U.S.C. § 120 as a continuation of PCT Patent Application No. PCT/CN2018/082019, filed on Apr. 4, 2018, the disclosure of which is incorporated herein by reference in its entirety.

TECHNICAL FIELD

The disclosure relates generally to wireless communications and, more particularly, to methods, apparatus and systems for preempting uplink transmission resource in a wireless communication.

BACKGROUND

The 4th Generation mobile communication technology (4G) Long-Term Evolution (LTE) or LTE-Advance (LTE-A) and the 5th Generation mobile communication technology (5G) face more and more demands. Based on the current development trend, 4G and 5G systems are developing supports on features of enhanced mobile broadband (eMBB), ultra-reliable low-latency communication (URLLC), and massive machine-type communication (mMTC).

In order to support the features of ultra-high reliability and ultra-low latency transmission, it is desirable to transmit low-delay and high-reliability services with a short transmission time. At the same time, the low-delay and high-reliability services can preempt at least part of resources of other services with a longer transmission time, when the other services have not yet been transmitted or are being transmitted. In order to reduce the performance impact on the low-delay and high-reliability services as much as possible, services with longer transmission time intervals or lower reliability need to be cancelled or stopped to avoid simultaneous transmissions with the low-delay and high-reliability services on the same resource. Currently, for the downlink service preemption transmission, 14 blocks are divided in the configured reference downlink resources and each block is indicated whether it is preempted based on a bitmap. However, there is no existing way to determine uplink reference resources for uplink preemption transmission and indicate uplink resource preemption.

Thus, existing systems and methods for indicating resource preemption in a wireless communication are not entirely satisfactory.

SUMMARY

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method performed by a wireless communication device is disclosed. The method comprises: receiving indication information, wherein the indication information indicates that a first resource region is at least partially preempted; and cancelling or stopping or puncturing an uplink transmission based on the indication information.

In another embodiment, a method performed by a wireless communication node is disclosed. The method comprises: transmitting indication information, wherein the indication information indicates that a first resource region is at least partially preempted, and an uplink transmission is to be cancelled or stopped or punctured based on the indication information.

In a different embodiment, a wireless communication node configured to carry out a disclosed method in some embodiment is disclosed.

In yet another embodiment, a wireless communication device configured to carry out a disclosed method in some embodiment is disclosed.

In still another embodiment, a non-transitory computer-readable medium having stored thereon computer-executable instructions for carrying out a disclosed method in some embodiment is disclosed.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION OF EXEMPLARY EMBODIMENTS

Figure 1:
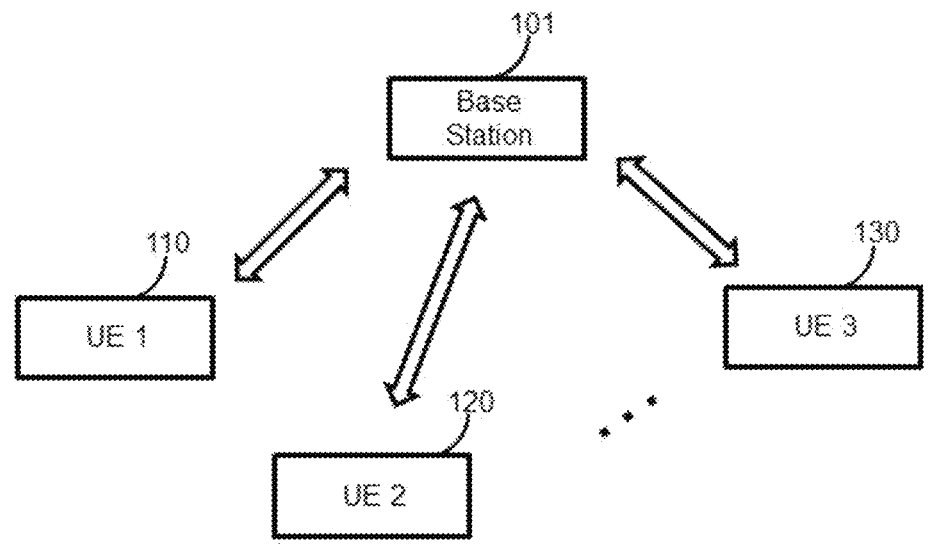
FIG. 1 illustrates an exemplary communication network in which techniques disclosed herein may be implemented, in accordance with an embodiment of the present disclosure.

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

A typical wireless communication network includes one or more base stations (typically known as a "BS") that each provides geographical radio coverage, and one or more wireless user equipment devices (typically known as a "UE") that can transmit and receive data within the radio coverage. In the wireless communication network, a BS and a UE can communicate with each other via a communication link, e.g., via a downlink radio frame from the BS to the UE or via an uplink radio frame from the UE to the BS.

During the transmissions of uplink services with different transmission time intervals in a communication network, a service with a lower reliability may be preempted by a service with a higher reliability, and a service with a longer transmission time interval may be preempted by a service with a shorter transmission time interval. Since different UEs in the uplink transmissions are not aware of the preempted transmission, in order to reduce the performance impact on the services with high reliability and low latency, the present disclosure provides methods for notifying uplink preemption indication information to the UEs whose uplink transmissions are preempted.

For example, the BS transmits preemption indication information to notify the preempted resources in a certain region. A UE receives the preemption indication information, and cancels or stops or punctures an uplink transmission based on the preemption indication information. The preemption indication information may indicate whether a reference uplink resource region is preempted, or whether each sub-region in the reference uplink resource region is preempted. The frequency domain corresponding to the reference uplink resource is referred to as the active uplink bandwidth part (BWP) of the UE; while the time domain corresponding to the reference uplink resource is a region offset from a starting or ending symbol of a control resource set where the preemption indication information is located. The offset value and the length of the region may be predefined, configured via a higher layer signaling, or dynamically indicated. The sub-regions can be divided from the reference uplink resource by frequency domain only, or by time domain only, or by time-frequency blocks.

The UE detects preemption indication information according to a configured monitoring period. In one example, the preemption indication is UE-specific information, the UE cancels or stops the uplink transmission upon receiving the preemption indication. In another example, the preemption indication is group common information, the UE determines whether the notified reference uplink resource conflicts with its own uplink transmission, and cancels or stops the uplink transmission if the conflict exists.

In various embodiments, a BS in the present disclosure can be referred to as a network side and can include, or be implemented as, a next Generation Node B (gNB), an E-UTRAN Node B (eNB), a Transmission/Reception Point (TRP), an Access Point (AP), etc.; while a UE in the present disclosure can be referred to as a terminal and can include, or be implemented as, a mobile station (MS), a station (STA), etc. A BS and a UE may be described herein as non-limiting examples of "wireless communication nodes," and "wireless communication devices" respectively, which can practice the methods disclosed herein and may be capable of wireless and/or wired communications, in accordance with various embodiments of the present disclosure.

FIG. 1 illustrates an exemplary communication network 100 in which techniques disclosed herein may be implemented, in accordance with an embodiment of the present disclosure. As shown in FIG. 1, the exemplary communication network 100 includes a base station (BS) 101 and a plurality of UEs, UE 1 110, UE 2 120 . . . UE 3 130, where the BS 101 can communicate with the UEs according to wireless protocols. A UE, e.g. UE 1 110, may be scheduled for an uplink transmission from the UE to the BS 101. That is, a resource region is reserved for the uplink transmission to be executed at a later time. The uplink transmission may be a data transmission based on at least one of: a physical uplink shared channel (PUSCH); a physical uplink control channel (PUCCH); a sounding reference signal (SRS).

Before the uplink transmission is executed or during the uplink transmission, the BS 101 may schedule a preempting uplink transmission on a preempted resource region that conflicts with the reserved resource region. For example, the preempted resource region at least partially overlaps with the reserved resource region. In this case, the UE receives indication information, e.g. from the BS 101. The indication information indicates that the reserved resource region is at least partially preempted. Then the UE may cancel or stop or puncture the uplink transmission previously scheduled on the reserved resource region.

Figure 2:
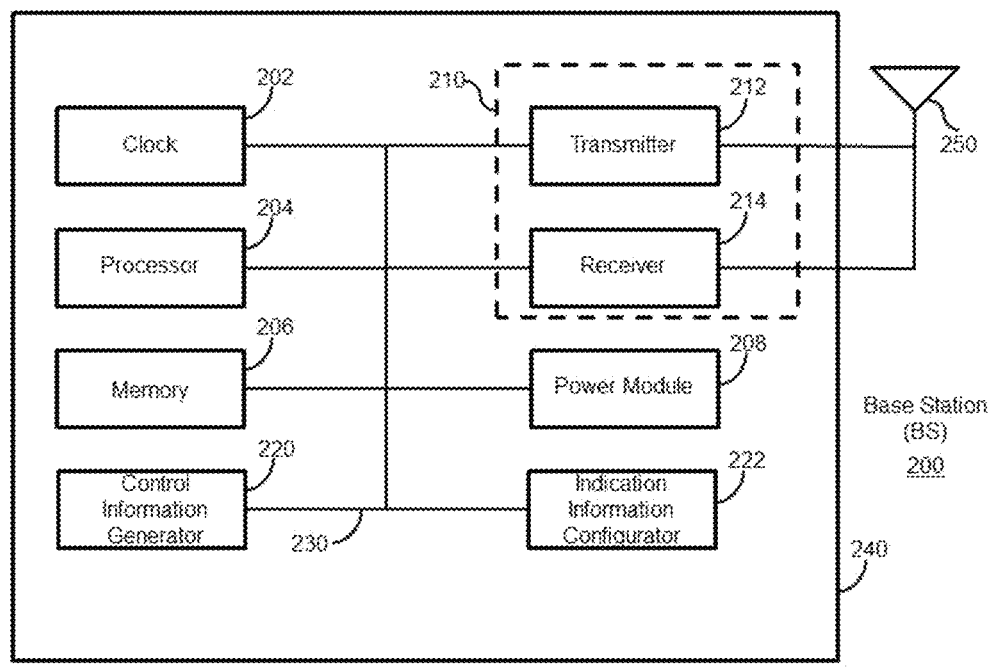
FIG. 2 illustrates a block diagram of a base station (BS), in accordance with some embodiments of the present disclosure.

FIG. 2 illustrates a block diagram of a base station (BS) 200, in accordance with some embodiments of the present disclosure. The BS 200 is an example of a device that can be configured to implement the various methods described herein. As shown in FIG. 2, the BS 200 includes a housing 240 containing a system clock 202, a processor 204, a memory 206, a transceiver 210 comprising a transmitter 212 and receiver 214, a power module 208, a control information generator 220 and an indication information configurator 222.

In this embodiment, the system clock 202 provides the timing signals to the processor 204 for controlling the timing of all operations of the BS 200. The processor 204 controls the general operation of the BS 200 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 206, which can include both read-only memory (ROM) and random access memory (RAM), can provide instructions and data to the processor 204. A portion of the memory 206 can also include non-volatile random access memory (NVRAM). The processor 204 typically performs logical and arithmetic operations based on program instructions stored within the memory 206. The instructions (a.k.a., software) stored in the memory 206 can be executed by the processor 204 to perform the methods described herein. The processor 204 and memory 206 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 210, which includes the transmitter 212 and receiver 214, allows the BS 200 to transmit and receive data to and from a remote device (e.g., the BS or another UE). An antenna 250 is typically attached to the housing 240 and electrically coupled to the transceiver 210. In various embodiments, the BS 200 includes (not shown) multiple transmitters, multiple receivers, and multiple transceivers. In one embodiment, the antenna 250 is replaced with a multi-antenna array 250 that can form a plurality of beams each of which points in a distinct direction. The transmitter 212 can be configured to wirelessly transmit packets having different packet types or functions, such packets being generated by the processor 204. Similarly, the receiver 214 is configured to receive packets having different packet types or functions, and the processor 204 is configured to process packets of a plurality of different packet types. For example, the processor 204 can be configured to determine the type of packet and to process the packet and/or fields of the packet accordingly.

In a wireless communication, the BS 200 may schedule uplink transmissions from terminals or UEs to the BS 200. For example, the control information generator 220 may generate control information, e.g. an uplink (UL) grant, for scheduling an uplink data transmission. The control information generator 220 can transmit, via the transmitter 212, the control information to the UE that will execute the uplink transmission. The control information may indicate a resource to be used for the scheduled uplink transmission by the UE. Based on the control information, the UE is scheduled to execute the uplink transmission at a certain time, e.g. one slot, after receiving the control information.

In one embodiment, while the UE is waiting for the scheduled time to execute the uplink transmission, or while the UE is executing the uplink transmission, the control information generator 220 may generate additional control information to schedule a preempting uplink transmission on a preempted resource region. The preempting uplink transmission may have lower latency and/or higher reliability than the originally scheduled uplink transmission. In one embodiment, the preempting uplink transmission is for an Ultra-Reliable and Low Latency Communication (URLLC) uplink service; while the originally scheduled uplink transmission is for an enhanced mobile broadband (eMBB) uplink service. The control information generator 220 can transmit, via the transmitter 212, the additional control information to a UE that will execute the preempting uplink transmission. The preempting uplink transmission may or may not be scheduled for the same UE as that of the originally scheduled uplink transmission. The preempted resource region in this case is preempted to be used for the preempting uplink transmission, such that it is desirable to cancel or stop other uplink transmissions scheduled or configured on the preempted resource region or on a resource region that conflicts with the preempted resource region. As such, the control information generator 220 can notify the indication information configurator 222 about the generation of the additional control information, and instruct the indication information configurator 222 to configure a preemption indication for the preempting uplink transmission.

The indication information configurator 222 in this example may receive a notification from the control information generator 220 that control information for a preempting uplink transmission on a preempted resource region is generated. As such, the indication information configurator 222 configures indication information to indicate that a first resource region, i.e. the preempted resource region, is at least partially preempted. The indication information configurator 222 can transmit, via the transmitter 212, the indication information, e.g. to a UE or a group of UEs. Based on the indication information, each UE receiving the indication information will cancel or stop or puncture uplink transmissions on the first resource region. The uplink transmission may be a data transmission based on at least one of: a PUSCH; a PUCCH; and a SRS. In one embodiment, the uplink transmission was scheduled or configured on a second resource region conflicted with the first resource region.

In one embodiment of the present disclosure, the first resource region is determined based on at least one of: an offset value of the first resource region and a length of the first resource region. The offset value represents a number of symbols or slots offset from a starting or ending symbol of a control resource set where the indication information is located, and is determined based on at least one of: a fixed value, a value configured by a higher layer signaling, and a value included in the indication information. The length is determined based on at least one of: a fixed value, a value configured by a higher layer signaling, and a value included in the indication information. The value configured by the higher layer signaling is an integral multiple of a monitoring period of the indication information.

In one embodiment of the present disclosure, the first resource region is at least partially preempted by a preempting uplink transmission. The offset value is not greater than a scheduling delay of the preempting uplink transmission. The scheduling delay of the preempting uplink transmission is not smaller than at least one of: a processing delay of the indication information, and a sum of the processing delay and a timing advance (TA). The TA is at least one of: a TA of a UE, and a maximum TA of a group of UEs.

In one embodiment of the present disclosure, the indication information comprises at least one of: a first quantity of bits each of which indicates whether a corresponding monitoring period in the first resource region including the first quantity of monitoring periods is preempted; and a second quantity of bits each of which indicates whether an uplink transmission from a corresponding one of the second quantity of a group of UEs is preempted.

The power module 208 can include a power source such as one or more batteries, and a power regulator, to provide regulated power to each of the above-described modules in FIG. 2. In some embodiments, if the BS 200 is coupled to a dedicated external power source (e.g., a wall electrical outlet), the power module 208 can include a transformer and a power regulator.

The various modules discussed above are coupled together by a bus system 230. The bus system 230 can include a data bus and, for example, a power bus, a control signal bus, and/or a status signal bus in addition to the data bus. It is understood that the modules of the BS 200 can be operatively coupled to one another using any suitable techniques and mediums.

Although a number of separate modules or components are illustrated in FIG. 2, persons of ordinary skill in the art will understand that one or more of the modules can be combined or commonly implemented. For example, the processor 204 can implement not only the functionality described above with respect to the processor 204, but also implement the functionality described above with respect to the indication information configurator 222. Conversely, each of the modules illustrated in FIG. 2 can be implemented using a plurality of separate components or elements.

Figure 3:
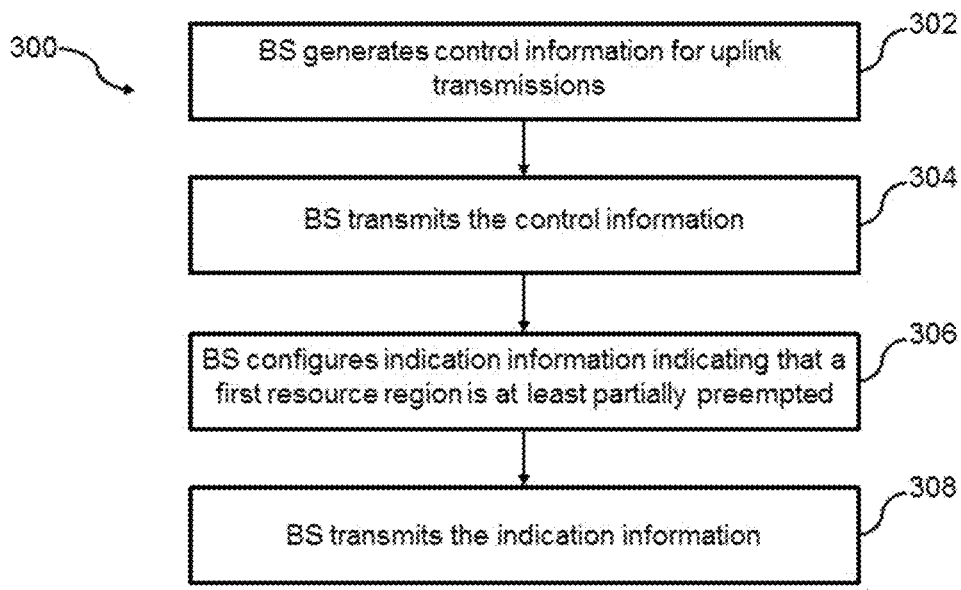
FIG. 3 illustrates a flow chart for a method performed by a BS for preempting uplink transmission resource in a wireless communication, in accordance with some embodiments of the present disclosure.

FIG. 3 illustrates a flow chart for a method 300 performed by a BS, e.g. the BS 200 in FIG. 2, for preempting uplink transmission resource in a wireless communication, in accordance with some embodiments of the present disclosure. At operation 302, the BS generates control information for uplink transmissions. At operation 304, the BS transmits the control information, e.g. to a UE or a group of UEs. At operation 306, the BS determines the indication information indicating that a first resource region is at least partially preempted. At operation 308, the BS transmits the indication information, e.g. to the UE or the group of UEs.

Figure 4:
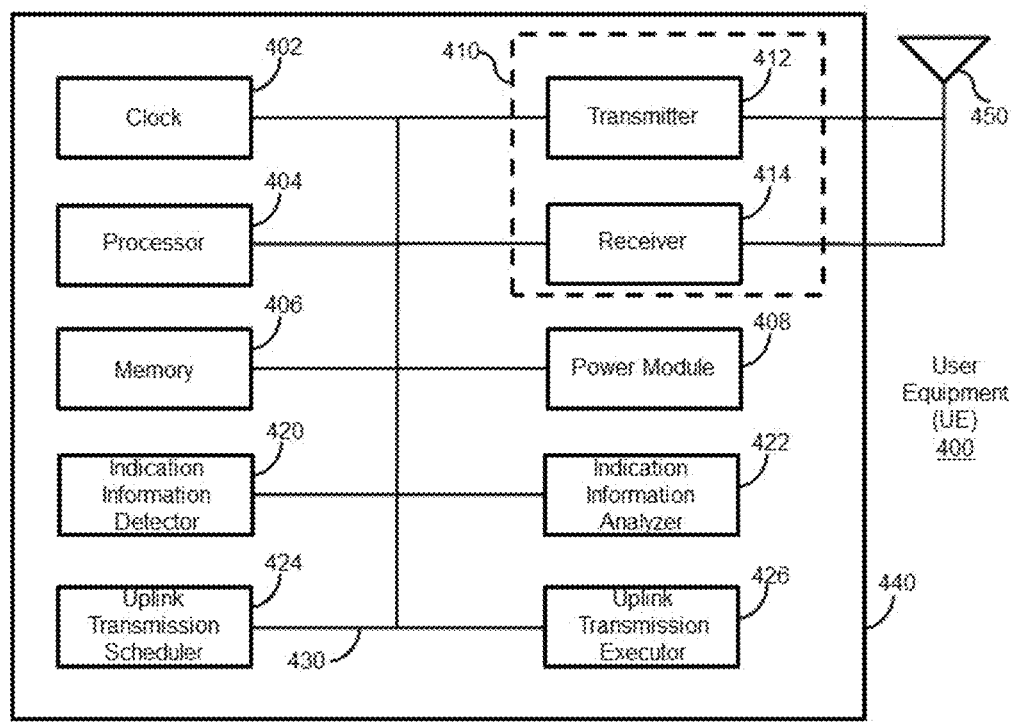
FIG. 4 illustrates a block diagram of a user equipment (UE), in accordance with some embodiments of the present disclosure.

FIG. 4 illustrates a block diagram of a UE 400, in accordance with some embodiments of the present disclosure. The UE 400 is an example of a device that can be configured to implement the various methods described herein. As shown in FIG. 4, the UE 400 includes a housing 440 containing a system clock 402, a processor 404, a memory 406, a transceiver 410 comprising a transmitter 412 and a receiver 414, a power module 408, an indication information detector 420, an indication information analyzer 422, an uplink transmission scheduler 424, and an uplink transmission executor 426.

In this embodiment, the system clock 402, the processor 404, the memory 406, the transceiver 410 and the power module 408 work similarly to the system clock 202, the processor 204, the memory 206, the transceiver 210 and the power module 208 in the BS 200. An antenna 450 or a multi-antenna array 450 is typically attached to the housing 440 and electrically coupled to the transceiver 410.

The indication information detector 420 in this example may detect control information and indication information transmitted by the BS. In one embodiment, the indication information detector 420 detects whether the BS transmits indication information according to a monitoring period, which may be e.g. a slot or a mini-slot. In one embodiment, the indication information detector 420 starts to detect indication information in response to a control signal, e.g. the UL grant, received from the BS. After detecting the control information, the indication information detector 420 may forward the control information to the uplink transmission scheduler 424 for scheduling an uplink transmission. After detecting the indication information, the indication information detector 420 may forward the indication information to the indication information analyzer 422 for analyzing the indication information. Based on the analysis of indication information, when the indication information indicates a preemption of an uplink resource region in a slot, the indication information detector 420 may stop detecting subsequent indication information until next received UL grant, or until the subsequent indication information indicating a resource region after the slot. The indication information detector 420 in this example receives, via the receiver 414, indication information that indicates that a first resource region is at least partially preempted, and forwards the indication information to the indication information analyzer 422 for analysis.

The indication information analyzer 422 in this example analyzes the indication information. Based on the analysis, the indication information analyzer 422 can identify the first resource region based on at least one of: an offset value of the first resource region and a length of the first resource region. In one embodiment, the offset value represents a number of symbols or slots offset from a starting or ending symbol of a control resource set where the indication information is located, and is determined based on at least one of: a fixed value, a value configured by a higher layer signaling, and a value included in the indication information. The length is determined based on at least one of: a fixed value, a value configured by a higher layer signaling, and a value included in the indication information. The value configured by the higher layer signaling is an integral multiple of a monitoring period of the indication information.

In one embodiment of the present disclosure, the first resource region is at least partially preempted by a preempting uplink transmission. The offset value is not greater than a scheduling delay of the preempting uplink transmission. The scheduling delay of the preempting uplink transmission is not smaller than at least one of: a processing delay of the indication information, and a sum of the processing delay and a TA. The TA is at least one of: a TA of the UE 400, and a maximum TA of a group of UEs including the UE 400.

In one embodiment of the present disclosure, the indication information comprises at least one of: a first quantity of bits each of which indicates whether a corresponding monitoring period in the first resource region including the first quantity of monitoring periods is preempted; and a second quantity of bits each of which indicates whether an uplink transmission from a corresponding one of the second quantity of a group of UEs is preempted.

The indication information analyzer 422 may determine whether an uplink transmission was scheduled or configured for the UE 400 on a second resource region conflicted with the first resource region. If so, the indication information analyzer 422 may notify the uplink transmission scheduler 424 to cancel the uplink transmission before the uplink transmission is executed, or notify the uplink transmission executor 426 to stop executing the uplink transmission during its execution.

The uplink transmission scheduler 424 in this example may receive an instruction from the indication information analyzer 422 determined based on the indication information. Following the instruction, the uplink transmission scheduler 424 may cancel the uplink transmission previously scheduled on a resource that is preempted based on the indication information. The uplink transmission may be a data transmission based on at least one of: a PUSCH; a PUCCH; and a SRS. In one embodiment, the uplink transmission was scheduled or configured on a second resource region conflicted with the first resource region.

In one embodiment, the uplink transmission scheduler 424 may cancel the uplink transmission in response to a conflict between the first resource region and the second resource region. In another embodiment, the uplink transmission scheduler 424 may cancel the uplink transmission regardless of whether there is a conflict between the first resource region and the second resource region. In yet another embodiment, the uplink transmission scheduler 424 may cancel uplink transmissions in an entire slot where the first resource region is located.

In one embodiment, the uplink transmission was scheduled to be transmitted in a manner of slot aggregation on the second resource region that includes a plurality of slots. The plurality of slots includes at least one preempted slot. In this case, the uplink transmission scheduler 424 may determine a first redundancy version scheduled in the at least one preempted slot according to the slot aggregation, and forward information related to the first redundancy version to the uplink transmission executor 426 for determining a redundancy version to transmit after the at least one preempted slot.

The uplink transmission executor 426 in this example can execute, stop or puncture an uplink transmission according to a scheduling of the uplink transmission scheduler 424 or the indication information analyzed by the indication information analyzer 422. In one embodiment, the uplink transmission executor 426 stops or punctures the uplink transmission based on the indication information.

In one embodiment, the uplink transmission executor 426 may stop or puncture the uplink transmission in response to a conflict between the first resource region and the second resource region. In another embodiment, the uplink transmission executor 426 may stop or puncture the uplink transmission regardless of whether there is a conflict between the first resource region and the second resource region. In yet another embodiment, the uplink transmission executor 426 may stop or puncture uplink transmissions in an entire slot where the first resource region is located. In still another embodiment, the uplink transmission executor 426 may resume the uplink transmission in the slot in response to subsequent indication information indicating a preempted resource region that has no conflict with the uplink transmission.

In one embodiment, the uplink transmission was scheduled to be transmitted in a manner of slot aggregation on the second resource region that includes a plurality of slots. The plurality of slots includes at least one preempted slot. In this case, the uplink transmission executor 426 may receive, from the uplink transmission scheduler 424, a first redundancy version scheduled in the at least one preempted slot according to the slot aggregation. In one example, the uplink transmission executor 426 may transmit the first redundancy version after the at least one preempted slot based on that the first redundancy version is redundancy version 0 (RV0). In another example, the uplink transmission executor 426 may transmit a second redundancy version after the at least one preempted slot based on original redundancy version pattern.

The various modules discussed above are coupled together by a bus system 430. The bus system 430 can include a data bus and, for example, a power bus, a control signal bus, and/or a status signal bus in addition to the data bus. It is understood that the modules of the UE 400 can be operatively coupled to one another using any suitable techniques and mediums.

Although a number of separate modules or components are illustrated in FIG. 4, persons of ordinary skill in the art will understand that one or more of the modules can be combined or commonly implemented. For example, the processor 404 can implement not only the functionality described above with respect to the processor 404, but also implement the functionality described above with respect to the indication information analyzer 422. Conversely, each of the modules illustrated in FIG. 4 can be implemented using a plurality of separate components or elements.

Figure 5:
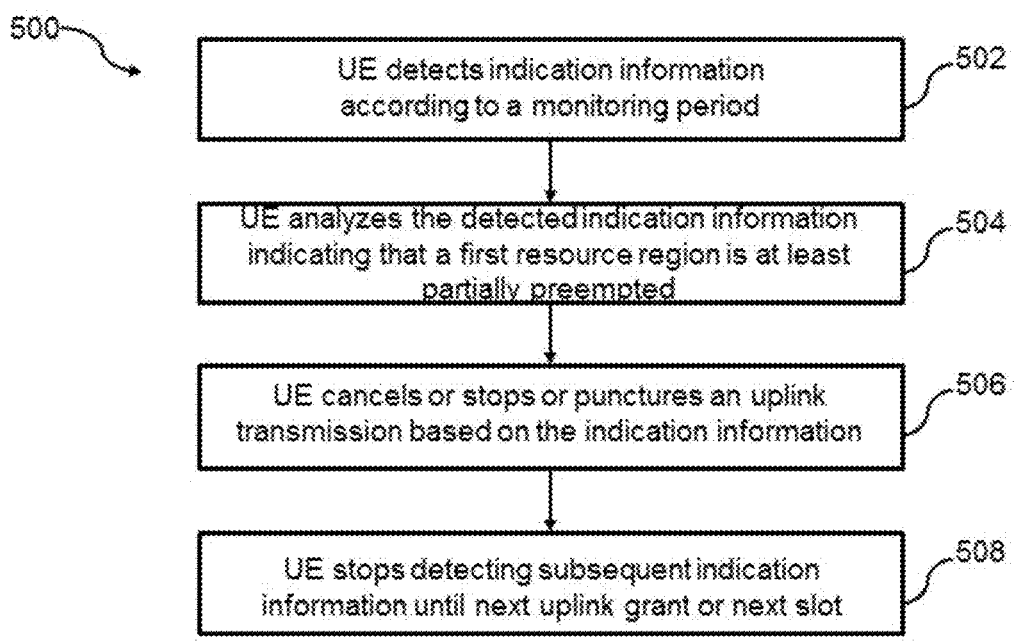
FIG. 5 illustrates a flow chart for a method performed by a UE for preempting uplink transmission resource in a wireless communication, in accordance with some embodiments of the present disclosure.

FIG. 5 illustrates a flow chart for a method 500 performed by a UE, e.g. the UE 400 in FIG. 4, for preempting uplink transmission resource in a wireless communication, in accordance with some embodiments of the present disclosure. At operation 502, the UE detects indication information according to a monitoring period. Optionally at operation 504, the UE analyzes the detected indication information indicating that a first resource region is at least partially preempted. At operation 506, the UE cancels or stops or punctures an uplink transmission based on the indication information. Optionally at operation 508, the UE stops detecting subsequent indication information until next uplink grant or next slot.

Different embodiments of the present disclosure will now be described in detail hereinafter. It is noted that the features of the embodiments and examples in the present disclosure may be combined with each other in any manner without conflict.

According to various embodiments of the present disclosure, a BS sends preemption indication information to notify the preempted resources in a certain region. The terminal or UE receives the preemption indication information, and cancels or stops the uplink transmission according to the preemption indication information. In one example, the BS schedules resources used by the Ultra-Reliable and Low Latency Communication (URLLC) uplink service to preempt resources that have been allocated to the enhanced mobile broadband (eMBB) uplink service. The BS sends the preemption indication information to notify the terminal whose resources are preempted to cancel or stop the transmission of the uplink service. In one embodiment, the URLLC service duration is not greater than the eMBB service duration. In one embodiment, the condition that the uplink (UL) Pre-emption Indication (PI) can be executed is that: the PI processing delay is less than the minimum URLLC uplink scheduling delay, or a sum of the PI processing delay and the time advance (TA) of one UE or the maximum TA of a group of UEs is less than or equal to the minimum URLLC uplink scheduling delay.

The preemption indication information may indicate a configured reference uplink resource region, and indicate whether there is URLLC transmission in the reference uplink resource region or any sub-region of the reference uplink resource region, where the sub-regions are divided according to a certain granularity. The preemption indication information may indicate a range of the reference uplink resource region. The frequency domain corresponding to the reference uplink resource region is referred to as the active UL bandwidth part (BWP) of the terminal. The time domain corresponding to the reference uplink resource region is the region after the starting or ending symbol of the control resource set where the current preemption indication information is located, and its offset value and length are predefined or configured via a higher layer signaling or dynamically indicated. The sub-regions can be divided from the reference uplink resource by frequency domain only, or by time domain only, or by time-frequency blocks.

The user or UE detects preemption information according to a configured monitoring period. After receiving the preemption information, the UE cancels the transmission or stops the transmission of the uplink service. In case the preemption information is UE-specific information, the transmission is canceled or stopped when it is received. In case the preemption information is group common information, the UE determines whether the notified reference uplink resource conflicts with its own uplink transmission, and cancels or stops the uplink transmission if the conflict exists. In the following embodiments, preemptions are given based on a URLLC with a short service duration preempting resources of an eMBB merely as examples. The same method can be applied to other uplink resource preemptions. When a resource of a UE is preempted, the UE does not need to know information about the service preempting its resource, e.g. object, type, and time duration of the service.

In a first embodiment, the base station schedules the resource used by the URLLC uplink service with a short duration to preempt resources that have been allocated to the eMBB uplink service. The BS sends the preemption indication information to notify the terminal whose resources are preempted to cancel or stop the transmission of the uplink service. The length of URLLC uplink service usage is 2 or 4 or 7 symbols. The URLLC uplink scheduling time interval is n+k1 mini-slots or symbols (e.g. OFDM symbols or SC-FDMA symbols), and k1 is an integer greater than or equal to 0. The eMBB uplink scheduling interval is n+k2 slots, and k2 is an integer greater than or equal to 0.

The preemption indication information may indicate a configured reference uplink resource region, and indicate whether there is URLLC transmission in the reference uplink resource region or any sub-region of the reference uplink resource region, where the sub-regions are divided according to a certain granularity. The frequency domain corresponding to the reference uplink resource region is referred to as the active UL bandwidth part (BWP) of the terminal. The time domain corresponding to the reference uplink resource region is the region after the starting or ending symbol of the control resource set where the current preemption indication information is located, and its offset value and length are predefined or configured via a higher layer signaling.

For the reference uplink resource indicated by the PI, the offset value is a fixed value or a configured value, for example, 4 symbols, or 7 symbols, or m times the monitoring period, m is a positive integer; the length is equal to a fixed value, or a configured value, for example, n times the monitoring period and n is a positive integer.

The content indicated by the PI includes at least one of the following: X bits for indicating whether each monitoring period in a Reference Uplink Resource (RUR) containing X monitoring periods is preempted; 1 bit used to indicate whether RUR is preempted, that is, whether there is URLLC transmission; N bits used to indicate, in a user group including N UEs, whether each UE needs to cancel or stop transmission; 2X bits used to indicate whether a first half $\lceil B_{INT}/2 \rceil$ and a second half $\lfloor B_{INT}/2 \rfloor$ physical resource blocks (PRBs) in each monitoring period in a RUR containing X monitoring periods are preempted, where $B_{INT}$ is the number of PRBs included in the active UL BWP; X bits used to indicate whether each of X frequency domain parts (the PRBs of RUR are divided into X parts) of a RUR is preempted; 2X bits used to indicate whether a first half $\lceil N_{INT}/2 \rceil$ and a second half $\lfloor N_{INT}/2 \rfloor$ symbols in each monitoring period in a RUR containing X monitoring periods are preempted, where $N_{INT}$ is the number of valid symbols included in the RUR; X bits used to indicate whether each of X time domain parts (the OFDM or SC-FDMA symbols of RUR are divided into X parts) of a RUR is preempted; 14 bits used to indicate whether the 14 resource sub-blocks in the RUR are preempted. The 14 resource sub-blocks are RUR resources divided in a manner of 14*1 or 7*2 in accordance with a higher layer signaling configuration. The above description is for a single-carrier preemption indication. When multiple carriers are used, each carrier is independently indicated.

The preemption indication information indicates whether each user in a user group is preempted for uplink transmission. For example, in a configured set of users, N bits are used to indicate whether each of the N users is preempted for uplink transmission, i.e. whether the scheduled uplink transmission needs to be cancelled or stopped. In another example, in a configured set of users, Y*N bits are used to indicate whether each of the N users is preempted for uplink transmission, and for a UE, whether the scheduled uplink transmission needs to be cancelled or stopped or punctured within each of Y parts, wherein the frequency range of the UL BWP or PUSCH is divided into Y parts, or the time domain of PUSCH or a slot is divided into Y parts.

Figure 6:
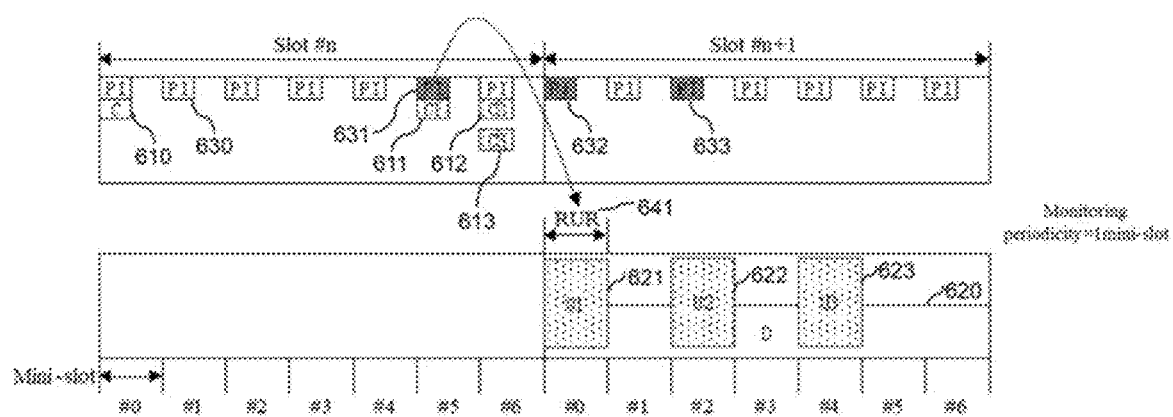
FIG. 6 illustrates an exemplary method for indicating uplink resource preemption, in accordance with an embodiment of the present disclosure.

The RUR indicated by a PI and the content indicated by the PI can be combined with each other. FIG. 6 illustrates an exemplary method for indicating uplink resource preemption. In this example, the configured monitoring period is 2 symbols or a mini-slot with a length of 2 symbols. The length of the reference uplink resource 641 in time domain is equal to the configured PI monitoring period. The offset value is twice the configured PI monitoring period. That is, the offset value is relative to the fourth symbol after the starting symbol of the control resource set where the PI is located. Suppose a sum of the PI processing delay and the TA is 3.5 symbols, and the URLLC uplink scheduling timing is 4 symbols. Then, the offset value takes 4 symbols and the condition for executing UL PI is satisfied. As shown in FIG. 6, assuming the PI 631 is located at the first symbol in mini-slot #n, the indicated RUR 641 is in mini-slot #n+2. In this example, X bits are used to indicate whether there is a URLLC service in each monitoring period in RUR including X monitoring periods. That is, 1 bit is used to indicate whether the RUR including one monitoring period is preempted, e.g., whether there is URLLC. In another example, N bits are used to indicate whether each of the N users is preempted for uplink transmission, each UE can decide whether the scheduled uplink transmission needs to be cancelled or stopped after receiving a PI. For a UE, the bit index in N bits can be configured by radio resource control (RRC). In another example, after receiving a PI, the UE will cancel the PUSCH if preempted, or the UE will stop the PSUCH if preempted and further. The uplink transmission may be resumed (that is, the preempted part is no longer sent, while continuing to send the part that is not preempted) or delayed (that is, the preempted part is delayed to the non-preempted resource for transmission, which means to the last part of the data is always preempted).

In this example, control information 610 schedules an uplink transmission for a UE in the resource region 620. The UE performs PI detection 630 according to the monitoring period. Each control information 611, 612, 613 of a URLLC service indicates a corresponding RUR in a resource region 621, 622, 623 respectively. Each PI 631, 632, 633 can only indicate URLLC service scheduled according to control information, e.g. UL grant, transmitted at the same time as and before the PI transmission time. For example, the PI 631 can only indicate URLLC service scheduled according to the control information 611, but not URLLC service scheduled according to the control information 612, 613.

Figure 7:
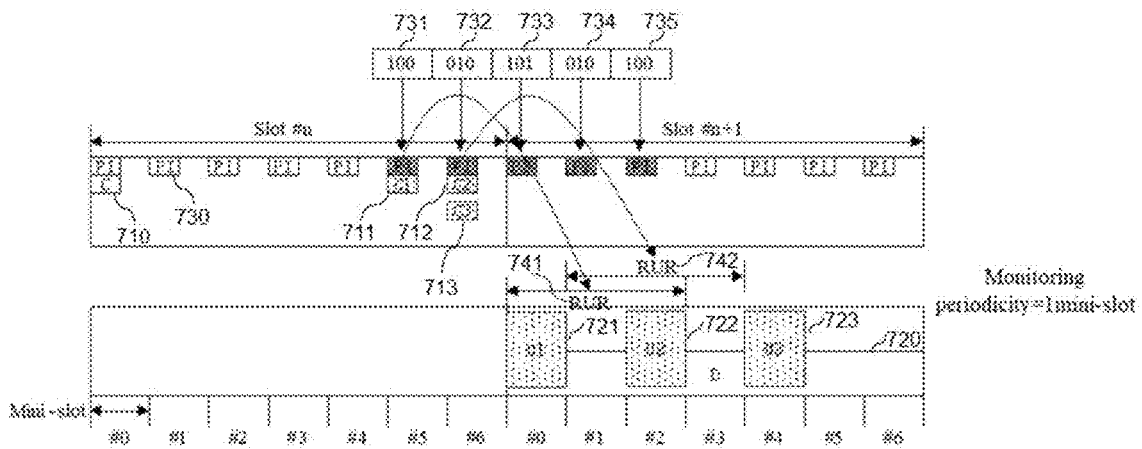
FIG. 7 illustrates another exemplary method for indicating uplink resource preemption, in accordance with an embodiment of the present disclosure.

FIG. 7 illustrates another exemplary method for indicating uplink resource preemption. In this example, the configured monitoring period is 2 symbols or a mini-slot with a length of 2 symbols. The length of the reference uplink resource in time domain is 3 times the configured PI monitoring period, and the offset value is 2 times the configured PI monitoring period. As shown in FIG. 7, assuming the PI 731, 732 is located at the first symbol in mini-slot #n, the indicated RUR 741, 742 is mini-slots #n+2 to #n+4. In this example, X bits are used to indicate whether each monitoring period in the RUR including X monitoring periods is preempted, e.g., whether there is a URLLC service. That is, 3 bits are used to indicate whether there is URLLC in each monitoring period in the RUR. When two PIs are inconsistent, the later received PI will prevail.

In this example, control information 710 schedules an uplink transmission for a UE in the resource region 720. The UE performs PI detection 730 according to the monitoring period. Each control information 711, 712, 713 of a URLLC service indicates a corresponding RUR in a resource region 721, 722, 723 respectively. Each PI 731, 732, 733, 734, 735 can only indicate URLLC service scheduled according to control information, e.g. UL grant, transmitted at the same time as and before the PI transmission time. For example, the PI 731 can only indicate URLLC service scheduled according to the control information 711, but not URLLC service scheduled according to the control information 712, 713. As such, the PI 731 includes 100, although the resource region 722 is also preempted based on a later control signal 712.

The user or UE detects preemption information according to the configured monitoring period. After receiving the preemption information, the user cancels the transmission or stops the transmission of the uplink service. Optionally, for the configuration of UL PI monitoring, the user starts to detect the received PI after receiving the UL grant, and does not need to monitor the UL PI when the UL grant is not received. Optionally, if the RUR receiving the PI indication has a URLLC, the transmissions under PUSCH in the slot corresponding to the RUR are deemed to be canceled or stopped. Further, it is not necessary to monitor or receive the PI indicating the RUR after the RUR in the slot. That is, no other uplink transmission is scheduled by default in subsequent RUR even if there is no conflict. In one example, when the received subsequent PI indicates no conflict or no subsequent PI is received, the uplink transmission by default is not resumed. In another example, when the received subsequent PI indicates no conflict, the uplink transmission on PUSCH continues in the RUR without conflict.

In one embodiment, when the received indication information uses 1 bit to indicate whether it is preempted, the uplink transmission is canceled or stopped; when the received indication information uses more than 1 bit to indicate that some of the resources in the reference uplink resource region are preempted, the uplink transmission on the preempted portion of the reference uplink resource region is canceled or stopped, and the uplink transmission on the remaining non-preempted portion of the reference uplink resource region is still being sent. The uplink transmission may be resumed (that is, the preempted part is no longer sent, while continuing to send the part that is not preempted) or delayed (that is, the preempted part is delayed to the non-preempted resource for transmission, which means to the last part of the data is always preempted). In another example, when the received indication information uses 1 bit to indicate whether it is preempted, the uplink transmission is stopped and resumed after the RUR indicated by the PI. In another example, when the received indication information uses 1 bit to indicate whether it is preempted, the uplink transmission is stopped and delayed after the RUR indicated by the PI.

When the preemption information is UE-specific information, the transmission is canceled or stopped when it is received. When the preemption information is group common information, the UE determines whether the notified resource range of the preemption indication conflicts with its own uplink service, and the transmission is canceled or stopped if the conflict exists. In one example, once the PI indication is detected after the UL grant, and whether or not there is a conflict, the original uplink transmission is canceled or stopped. In another example, once the PI indication is detected after the UL grant and there is a conflict with the scheduled uplink services, the original uplink transmission is cancelled or stopped and do not resume until the next UL grant is received or until next slot. There is no need to monitor or receive the PI until the next UL grant is received or until next slot.

In one embodiment, the condition for the UL PI to work is that the delay of the PI processing is less than the uplink scheduling delay of the URLLC, and the function is enabled when the condition is satisfied. Alternatively, the monitoring period is configurable. The unit of the monitoring period is slot, mini-slot, or symbol. Optionally, when the received PI indicates to cancel or stop the transmission, the PUSCH transmission is canceled or punctured when the PUSCH has not been transmitted, and the PUSCH transmission is stopped or punctured when it is being transmitted. The canceling and stopping may refer to cancel and stop the entire transmission, or merely cancel and stop the conflict portion of the transmission, where the non-conflicting portion is still transmitted.

In a second embodiment, the base station schedules the resource used by the URLLC uplink service with a short duration to preempt resources that have been allocated to the eMBB uplink service. The BS sends the preemption indication information to notify the terminal whose resources are preempted to cancel or stop the transmission of the uplink service. The length of URLLC uplink service usage is 2 or 4 or 7 symbols. The URLLC uplink scheduling time interval is n+k1 mini-slots or symbols (e.g. OFDM symbols or SC-FDMA symbols), and k1 is an integer greater than or equal to 0. The eMBB uplink scheduling interval is n+k2 slots, and k2 is an integer greater than or equal to 0.

The preemption indication information may indicate a configured reference uplink resource region, and indicate whether there is URLLC transmission in the reference uplink resource region or any sub-region of the reference uplink resource region, where the sub-regions are divided according to a certain granularity. The frequency domain corresponding to the reference uplink resource region is referred to as the active UL bandwidth part (BWP) of the terminal. The time domain corresponding to the reference uplink resource region is the region after the starting or ending symbol of the control resource set where the current preemption indication information is located, and the starting offset is predefined or dynamically indicated, and the length is dynamically indicated.

For the reference uplink resource indicated by the PI, the offset value is a fixed value or a configured value or a dynamically indicated value, for example, 4 symbols, or 7 symbols, or m times of the monitoring period, m is a positive integer; the length is a dynamic indicated value, for example, n times the monitoring period, and n is a positive integer.

The content indicated by the PI includes at least one of the following: Y bits used to indicate the starting offset and length of RUR, where the starting offset and the length may be multiple times of the monitoring period, where the indicated RUR is preempted by default, i.e. there is a URLLC transmission by default based on the indicated RUR; Y bits used to indicate the length of RUR, where the starting offset value is a fixed value or a value configured by higher-layer signaling, e.g. fixed to 4 symbols or two 2-symbol mini-slots, where there is URLLC transmission in the default indicated RUR; Y bits used to indicate the starting offset and frequency range of RUR, where the indicated RUR is preempted by default, i.e. there is a URLLC transmission by default based on the indicated RUR; Y bits used to indicate the frequency range of RUR, where the starting offset value is a fixed value or a value configured by higher-layer signaling, e.g. fixed to 4 symbols or two 2-symbol mini-slots, where there is URLLC transmission in the default indicated RUR; Y bits used to indicate the starting offset, length and frequency range of RUR, where the indicated RUR is preempted by default, i.e. there is a URLLC transmission by default based on the indicated RUR; Y+X bits used to indicate whether each resource sub-block in the RUR containing X resource sub-regions is preempted, i.e., whether there is a URLLC service in each sub-block; Y+2X bits used to indicate whether the first half $\lceil B_{INT}/2 \rceil$ and the second half $\lfloor B_{INT}/2 \rfloor$ PRBs of each resource sub-region in the RUR containing the X resource sub-regions are preempted, i.e., whether there is a URLLC service, where $B_{INT}$ is the number of PRBs included in the active UL BWP; Y+X bits used to indicate whether each of X frequency domain parts (the PRBs of RUR are divided into X parts) of a RUR is preempted; Y+2X bits used to indicate whether the first half $\lceil N_{INT}/2 \rceil$ and the second half $\lfloor N_{INT}/2 \rfloor$ symbols of each resource sub-block in the RUR containing X resource sub-blocks are preempted, that is, whether there is a URLLC service, where $N_{INT}$ is the number of valid symbols contained in one resource sub-block in RUR; Y+X bits used to indicate whether each of X time domain parts (the OFDM or SC-FDMA symbols of RUR are divided into X parts) of a RUR is preempted; Y+14 bits used to indicate whether the 14 resource sub-blocks in the RUR are preempted, i.e., whether there is a URLLC service, and where 14 resource sub-blocks are RUR resources divided in a manner of 14*1 or 7*2 according to a high-level signaling configuration.

The above description is for a single-carrier preemption indication. When multiple carriers are used, each carrier is independently indicated. The RUR indicated by a PI and the content indicated by the PI can be combined with each other.

Figure 8:
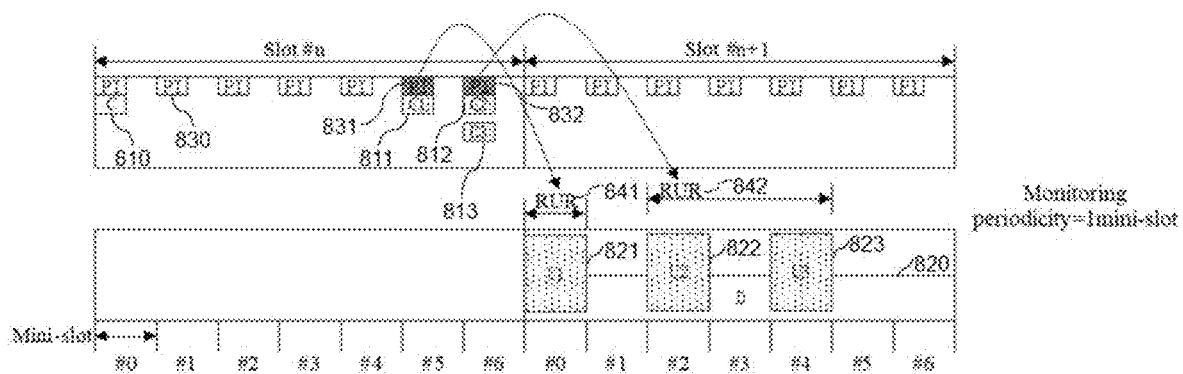
FIG. 8 illustrates an exemplary method for indicating uplink resource preemption with a dynamically indicated length of reference uplink resource, in accordance with an embodiment of the present disclosure.

FIG. 8 illustrates an exemplary method for indicating uplink resource preemption with a dynamically indicated length of reference uplink resource. In this example, the configured monitoring period is 2 symbols or a mini-slot with a length of 2 symbols. The length of the reference uplink resource region in time domain is a value dynamically indicated by the PI and is an integral multiple of the configured PI monitoring period. The offset value is a value dynamically indicated by the PI and is an integral multiple of the configured PI monitoring period. As shown in FIG. 8, the PI 831, 832 indicates that there is a URLLC service in the RUR 841, 842. For example, the RUR 841 indicated by the mini-slot #5 in the slot #n of the PI 831 is the first two symbols in the slot #n+1, that is, the RUR 841 is determined with an offset value of 4 symbols and a length of 2 symbols. In another example, the RUR 842 indicated by the mini-slot #6 in the slot #n of the PI 832 is the symbols #4 to #9 in the slot #n+1 (i.e., the mini-slots #2 to #4 in the slot #n+1 in the figure), that is, the RUR 842 is determined by an offset value of 6 symbols and a length of 6 symbols. In this example, Y bits are used to indicate the starting offset and the length of the RUR, wherein the starting offset and the length are a multiple integer times the monitoring period, and the URLLC transmission exists in a default indicated RUR. Suppose that the RUR timing interval indicated by the PI is n+k0+S, where k0=4 symbols, the range of the starting offset is S=0 to 12 symbols, i.e. k0+S is equal to the offset value. The length range is L=2 to 14 symbols. The offset and length can be indicated independently or by joint coding. That is, a continuous resource allocation method may be used to jointly indicate the RUR time domain range, i.e., if (L−1)≤7 then RIV=14×(L−1)+S; else RIV=14×(14−L+1)+(14−1−S); where 0<L≤14−S, RIV represents resource indication value, and Y=7 bits. For example, 4 bits are used to indicate S and 4 bits are used to indicate L, then Y=8 bits.

In this example, control information 810 schedules an uplink transmission for a UE in the resource region 820. The UE performs PI detection 830 according to the monitoring period. Each control information 811, 812, 813 of a URLLC service indicates a corresponding RUR in a resource region 821, 822, 823 respectively. Each PI 831, 832 can only indicate URLLC service scheduled according to control information, e.g. UL grant, transmitted at the same time as and before the PI transmission time. For example, the PI 831 can only indicate URLLC service scheduled according to the control information 811, but not URLLC service scheduled according to the control information 812, 813.

Figure 9:
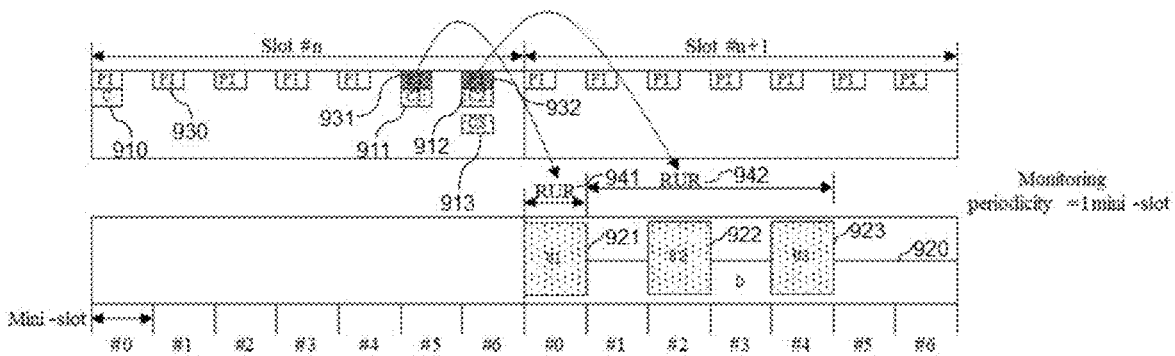
FIG. 9 illustrates another exemplary method for indicating uplink resource preemption with a dynamically indicated length of reference uplink resource, in accordance with an embodiment of the present disclosure.

FIG. 9 illustrates another exemplary method for indicating uplink resource preemption with a dynamically indicated length of reference uplink resource. In this example, the configured monitoring period is 2 symbols or a mini-slot with a length of 2 symbols. The length of the reference uplink resource region in time domain is a value dynamically indicated by the PI and is an integral multiple of the configured PI monitoring period. The offset value is a fixed value, for example, 4 symbols. As shown in FIG. 9, the PI 931, 932 indicates that there is a URLLC service in the RUR 941, 942. For example, the RUR 941 indicated by the mini-slot #5 in the slot #n of the PI 931 is the first two symbols in the slot #n+1, that is, the RUR 941 is determined with an offset value of 4 symbols and a length of 2 symbols. In another example, the RUR 942 indicated by the mini-slot #6 in the slot #n of the PI 932 is the symbols #2 to #9 in the slot #n+1 (i.e., the mini-slots #1 to #4 in the slot #n+1 in the figure), that is, the RUR 942 is determined by an offset value of 4 symbols and a length of 8 symbols. In this example, Y bits are used to indicate the length of RUR, where the starting offset of the RUR is a fixed value, e.g., fixed to 4 symbols or two 2-symbol mini-slots, wherein the length is n times of the monitoring period. There is a URLLC transmission in the default indicated RUR. Suppose that the RUR timing interval indicated by the PI is n+k0, where k0=4 symbols, i.e. k0 is equal to the offset value and the length range is L=2 to 14 symbols. In this case, 4 bits are used to indicate the RUR time domain range, that is, to indicate 13 values in total from 2 to 14.

In this example, control information 910 schedules an uplink transmission for a UE in the resource region 920. The UE performs PI detection 930 according to the monitoring period. Each control information 911, 912, 913 of a URLLC service indicates a corresponding RUR in a resource region 921, 922, 923 respectively. Each PI 931, 932 can only indicate URLLC service scheduled according to control information, e.g. UL grant, transmitted at the same time as and before the PI transmission time. For example, the PI 931 can only indicate URLLC service scheduled according to the control information 911, but not URLLC service scheduled according to the control information 912, 913.

The user or UE detects preemption information according to the configured monitoring period. After receiving the preemption information, the user cancels the transmission or stops the transmission of the uplink service. Optionally, for the configuration of UL PI monitoring, the user starts to detect the received PI after receiving the UL grant, and does not need to monitor the UL PI when the UL grant is not received. Optionally, if the RUR receiving the PI indication has a URLLC, the transmissions under PUSCH in the slot corresponding to the RUR are deemed to be canceled or stopped. Further, it is not necessary to monitor or receive the PI indicating the RUR after the RUR in the slot. That is, no other uplink transmission is scheduled by default in subsequent RUR even if there is no conflict. In one example, when the received subsequent PI indicates no conflict or no subsequent PI is received, the uplink transmission by default is not resumed. In another example, when the received subsequent PI indicates no conflict, the uplink transmission on PUSCH continues in the RUR without conflict.

In one embodiment, when the received indication information uses 1 bit to indicate whether it is preempted, the uplink transmission is canceled or stopped; when the received indication information uses more than 1 bit to indicate that some of the resources in the reference uplink resource region are preempted, the uplink transmission on the preempted portion of the reference uplink resource region is canceled or stopped, and the uplink transmission on the remaining non-preempted portion of the reference uplink resource region is still being sent. The uplink transmission may be resumed (that is, the preempted part is no longer sent, while continuing to send the part that is not preempted) or delayed (that is, the preempted part is delayed to the non-preempted resource for transmission, which means to the last part of the data is always preempted). In another example, when the received indication information uses 1 bit to indicate whether it is preempted, the uplink transmission is stopped and resumed after the RUR indicated by the PI. In another example, when the received indication information uses 1 bit to indicate whether it is preempted, the uplink transmission is stopped and delayed after the RUR indicated by the PI.

When the preemption information is UE-specific information, the transmission is canceled or stopped when it is received. When the preemption information is group common information, the UE determines whether the notified resource range of the preemption indication conflicts with its own uplink service, and the transmission is canceled or stopped if the conflict exists. In one example, once the PI indication is detected after the UL grant, and whether or not there is a conflict, the original uplink transmission is canceled or stopped. In another example, once the PI indication is detected after the UL grant and there is a conflict with the scheduled uplink services, the original uplink transmission is cancelled or stopped and do not resume until the next UL grant is received or until next slot. There is no need to monitor or receive the PI until the next UL grant is received or until next slot.

In one embodiment, the condition for the UL PI to work is that the delay of the PI processing is less than the uplink scheduling delay of the URLLC, and the function is enabled when the condition is satisfied. Alternatively, the monitoring period is configurable. The unit of the monitoring period is slot, mini-slot, or symbol. Optionally, when the received PI indicates to cancel or stop the transmission, the PUSCH transmission is canceled or punctured when the PUSCH has not been transmitted, and the PUSCH transmission is stopped or punctured when it is being transmitted. The canceling and stopping may refer to cancel and stop the entire transmission, or merely cancel and stop the conflict portion of the transmission, where the non-conflicting portion is still transmitted.

In a third embodiment, the base station schedules the resource used by the URLLC uplink service with a short duration to preempt resources that have been allocated to the eMBB uplink service. The BS sends the preemption indication information to notify the terminal whose resources are preempted to cancel or stop the transmission of the uplink service. The length of URLLC uplink service usage is 2 or 4 or 7 symbols. The URLLC uplink scheduling time interval is n+k1 slots, and k1 is an integer greater than or equal to 0. The eMBB uplink scheduling interval is n+k2 slots, and k2 is an integer greater than or equal to 0.

The preemption indication information may indicate a configured reference uplink resource region, and indicate whether there is URLLC transmission in the reference uplink resource region or any sub-region of the reference uplink resource region, where the sub-regions are divided according to a certain granularity. The frequency domain corresponding to the reference uplink resource region is referred to as the active UL bandwidth part (BWP) of the terminal. The time domain corresponding to the reference uplink resource region is the region after the starting or ending symbol of the control resource set where the current preemption indication information is located, and its offset value and length are predefined or configured by higher layer signaling.

For the reference uplink resource indicated by the PI, the offset value is a fixed value or a configured value, for example, 4 symbols, or 7 symbols, or m times the monitoring period, m is a positive integer; the length is equal to a fixed value, or a configured value, for example, n times the monitoring period and n is a positive integer. Further, the reference uplink resource does not cross the slot boundary.

The content indicated by the PI includes at least one of the following: X bits used to indicate whether each monitoring period in a Reference Uplink Resource (RUR) containing X monitoring periods is preempted, that is, whether there is URLLC service; 2X bits used to indicate whether the first half $\lceil B_{INT}/2 \rceil$ and the second half $\lfloor B_{INT}/2 \rfloor$ PRBs in each monitoring period in a RUR containing X monitoring periods are preempted, that is, whether there is a URLLC service, where $B_{INT}$ is the number of PRBs included in the active UL BWP; 2X bits used to indicate whether the first half $\lceil N_{INT}/2 \rceil$ and the second half $\lfloor N_{INT}/2 \rfloor$ symbols in each monitoring period in a RUR containing X monitoring periods are preempted, that is, whether there is a URLLC service, where $N_{INT}$ is the number of valid symbols included in the RUR; 14 bits used to indicate whether the 14 resource sub-blocks in the RUR are preempted, that is, whether there is a URLLC service, and the 14 resource sub-blocks are RUR resources divided in a manner of 14*1 or 7*2 in accordance with a higher layer signaling configuration.

The above description is for a single-carrier preemption indication. When multiple carriers are used, each carrier is independently indicated. The RUR indicated by a PI and the content indicated by the PI can be combined with each other.

Figure 10:
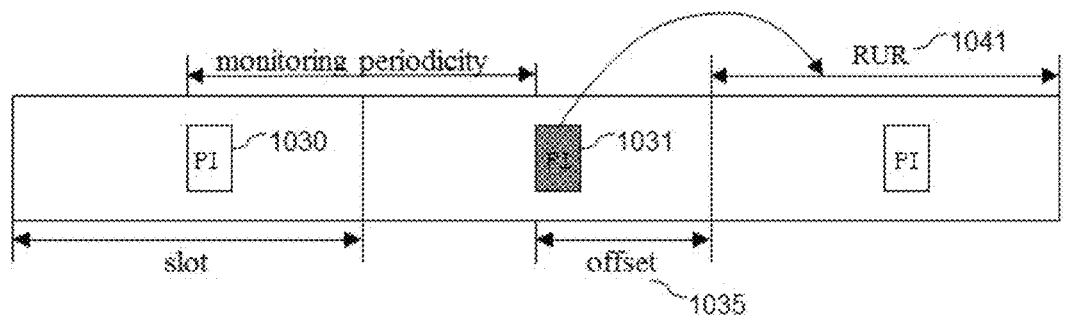
FIG. 10 illustrates an exemplary method for indicating uplink resource preemption with a reference uplink resource length equal to a slot, in accordance with an embodiment of the present disclosure.
Figure 11:
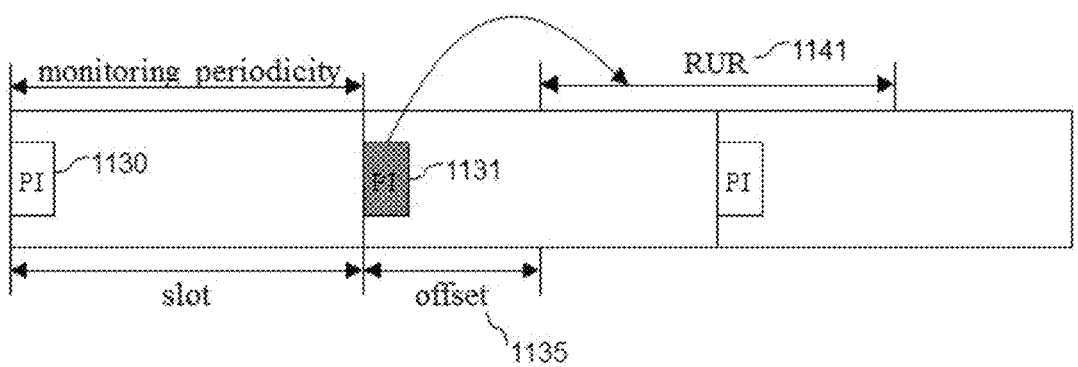
FIG. 11 illustrates another exemplary method for indicating uplink resource preemption with a reference uplink resource length equal to a slot, in accordance with an embodiment of the present disclosure.
Figure 14:
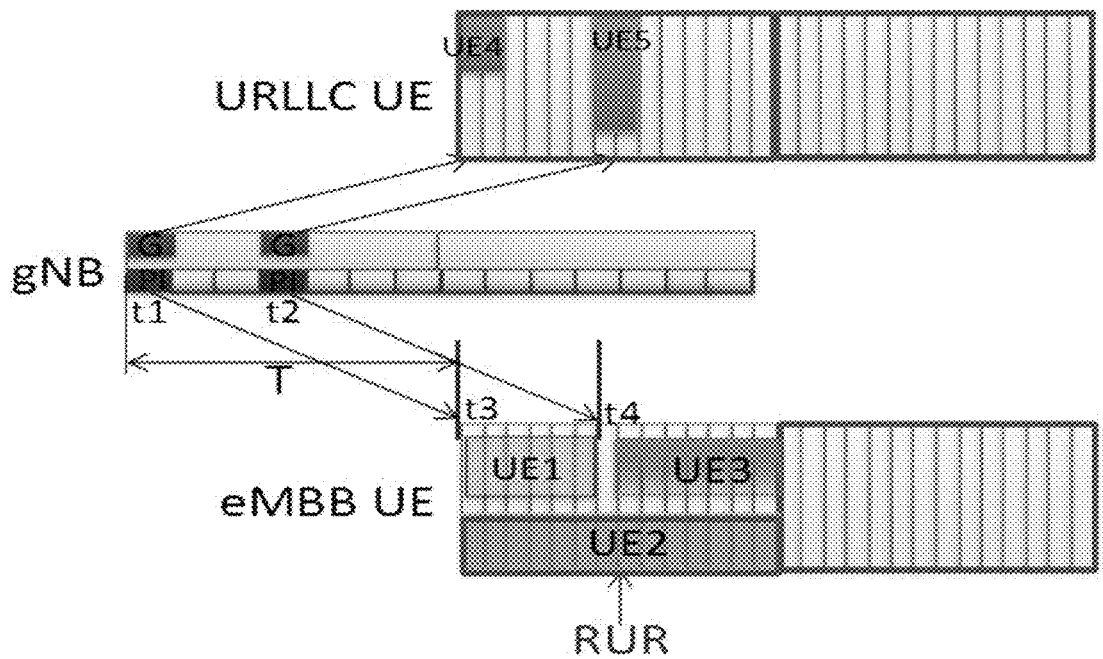
FIG. 14 illustrates an exemplary uplink preemption indicator for indicating uplink resource preemption, in accordance with an embodiment of the present disclosure.

FIG. 10 and FIG. 11 illustrate exemplary methods for indicating uplink resource preemption with a reference uplink resource length equal to a slot. In both examples, the monitoring period is configured to be one slot. The length of the reference uplink resource is equal to the configured PI monitoring period. The offset is a value configured by a higher layer signaling or a fixed value, for example, 4 symbols. As shown in FIG. 10, suppose that the RUR 1041 indicated by the PI 1031 is a slot that does not cross the slot boundary, where the offset value is by 4 symbols, the control resource set and search space where the configured PI is located are (offset-P) symbols away from the starting boundary of the slot, where P represents the number of symbols of the control resource set, and the offset value 1035 is the number of symbols offset from the starting symbol of the control resource set where the current preemption indication information is located. As shown in FIG. 11, suppose that the RUR 1141 indicated by the PI 1131 is across the slot boundary and its length is equal to 1 slot. At this time, the offset value 1135 is 4 symbols. The control resource set and search space where the configured PI is located are (offset-P) symbols away from the starting boundary of the RUR indicated by the PI, where P represents the number of symbols of the control resource set, and the offset value is the number of symbols offset from the starting symbol of the control resource set where the current preemption indication information is located. In both examples as shown in FIG. 10 and FIG. 11, 14 bits may be used to indicate whether there is URLLC service in the 14 resource sub-blocks in the RUR, and the 14 resource sub-blocks are RUR resources divided in a manner of 14*1 or 7*2 in accordance with a higher layer signaling configuration.

In this example, the UE performs PI detection 1030, 1120 according to the monitoring period equal to one slot. Each PI 1031, 1131 can only indicate URLLC service scheduled according to control information, e.g. UL grant, transmitted at the same time as and before the PI transmission time.

The user or UE detects preemption information according to the configured monitoring period. After receiving the preemption information, the user cancels the transmission or stops the transmission of the uplink service. Optionally, for the configuration of UL PI monitoring, the user starts to detect the received PI after receiving the UL grant, and does not need to monitor the UL PI when the UL grant is not received. Optionally, if the RUR receiving the PI indication has a URLLC, the transmissions under PUSCH in the slot corresponding to the RUR are deemed to be canceled or stopped. Further, it is not necessary to monitor or receive the PI indicating the RUR after the RUR in the slot. That is, no other uplink transmission is scheduled by default in subsequent RUR even if there is no conflict. In one example, when the received subsequent PI indicates no conflict or no subsequent PI is received, the uplink transmission by default is not resumed. In another example, when the received subsequent PI indicates no conflict, the uplink transmission on PUSCH continues in the RUR without conflict.

In one embodiment, when the received indication information uses 1 bit to indicate whether it is preempted, the uplink transmission is canceled or stopped; when the received indication information uses more than 1 bit to indicate that some of the resources in the reference uplink resource region are preempted, the uplink transmission on the preempted portion of the reference uplink resource region is canceled or stopped, and the uplink transmission on the remaining non-preempted portion of the reference uplink resource region is still being sent. The uplink transmission may be resumed (that is, the preempted part is no longer sent, while continuing to send the part that is not preempted) or delayed (that is, the preempted part is delayed to the non-preempted resource for transmission, which means to the last part of the data is always preempted). In another example, when the received indication information uses 1 bit to indicate whether it is preempted, the uplink transmission is stopped and resumed after the RUR indicated by the PI. In another example, when the received indication information uses 1 bit to indicate whether it is preempted, the uplink transmission is stopped and delayed after the RUR indicated by the PI.

When the preemption information is UE-specific information, the transmission is canceled or stopped when it is received. When the preemption information is group common information, the UE determines whether the notified resource range of the preemption indication conflicts with its own uplink service, and the transmission is canceled or stopped if the conflict exists. In one example, once the PI indication is detected after the UL grant, and whether or not there is a conflict, the original uplink transmission is canceled or stopped. In another example, once the PI indication is detected after the UL grant and there is a conflict with the scheduled uplink services, the original uplink transmission is cancelled or stopped and do not resume until the next UL grant is received or until next slot. There is no need to monitor or receive the PI until the next UL grant is received or until next slot.

In one embodiment, the condition for the UL PI to work is that the delay of the PI processing is less than the uplink scheduling delay of the URLLC, and the function is enabled when the condition is satisfied. Alternatively, the monitoring period is configurable. The unit of the monitoring period is slot, mini-slot, or symbol. Optionally, when the received PI indicates to cancel or stop the transmission, the PUSCH transmission is canceled or punctured when the PUSCH has not been transmitted, and the PUSCH transmission is stopped or punctured when it is being transmitted. The canceling and stopping may refer to cancel and stop the entire transmission, or merely cancel and stop the conflict portion of the transmission, where the non-conflicting portion is still transmitted.

In a fourth embodiment, the base station schedules the resource used by the URLLC uplink service with a short duration to preempt resources that have been allocated to the eMBB uplink service. The BS sends the preemption indication information to notify the terminal whose resources are preempted to cancel or stop the transmission of the uplink service. The length of URLLC uplink service usage is 2 or 4 or 7 symbols. The URLLC uplink scheduling time interval is n+k1 mini-slots or symbols (e.g. OFDM symbols or SC-FDMA symbols), and k1 is an integer greater than or equal to 0. The eMBB uplink scheduling interval is n+k2 slots, and k2 is an integer greater than or equal to 0.

The preemption indication information indicates whether each user in a user group is preempted for uplink transmission. For example, in a configured set of users, N bits are used to indicate whether each of the N users is preempted for uplink transmission, i.e. whether the scheduled uplink transmission needs to be cancelled or stopped. In another example, in a configured set of users, Y*N bits are used to indicate whether each of the N users is preempted for uplink transmission, and for a UE, whether the scheduled uplink transmission needs to be cancelled or stopped or punctured within each of Y parts, wherein the frequency range of the UL BWP or PUSCH is divided into Y parts, or the time domain of PUSCH or a slot is divided into Y parts.

In one example, the scheduled uplink transmission is cancelled or stopped upon receiving the PI indication information. In another example, after receiving the PI indication information, the uplink transmission preemption becomes effective in a region after the starting or ending symbol of the control resource set where the current preemption indication information is located. The offset value is pre-defined or determined based on a higher layer signaling configuration or a dynamic indication, for example, 4 symbols, or 7 symbols, or m times of the monitoring period, m is a positive integer.

Figure 12:
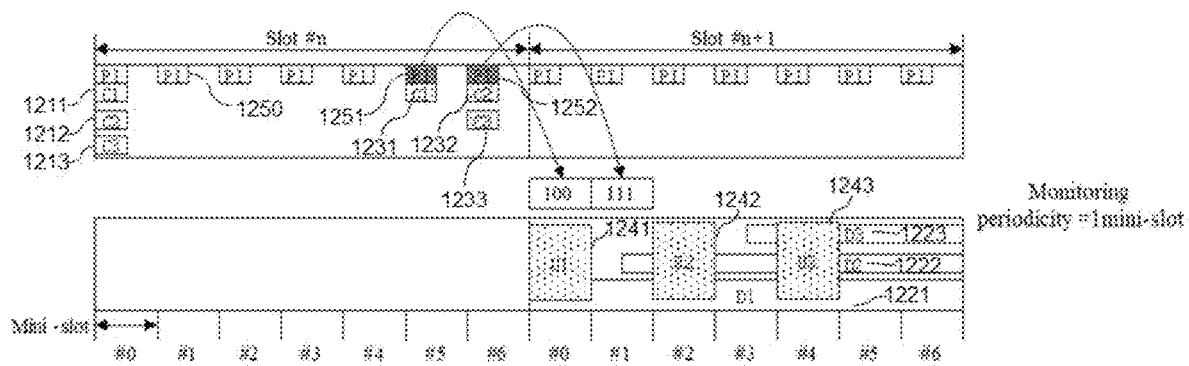
FIG. 12 illustrates an exemplary method for indicating uplink resource preemption with respect to a group of users, in accordance with an embodiment of the present disclosure.

The content indicated by the PI includes using N bits to indicate, in a user group including N UEs, whether each UE needs to cancel or stop uplink transmission. FIG. 12 illustrates an exemplary method for indicating uplink resource preemption with respect to a group of users. In this example, the configured monitoring period is 2 symbols or a mini-slot with a length of 2 symbols. The length of the reference uplink resource in time domain is equal to a configured PI monitoring period. The offset value is four symbols after the starting symbol of the control resource set where the PI is located. As shown in FIG. 12, it is assumed that a user group includes three users, and the PI 1251, 1252 is located at the first symbol in mini-slot #n, and the resource preemption takes effect from the mini-slot #n+2 to the end of RUR (this mini-slot). That is, the effect starting time for the PI is at the beginning of the mini-slot #n+2. In this example, 3 bits are used to indicate whether each user in the user group including 3 users is preempted. In this case, each bit corresponds to one user and the user sequence is configured by a higher layer signaling.

In one example, a PI takes effect until a slot boundary. In another example, a PI takes effect from the effect starting time to the ending symbol of the slot indicated by the PI.

In this example, control information 1211, 1212, 1213 schedules uplink transmissions for three UEs in the resource regions 1221, 1222, 1223, respectively. Each UE may perform PI detection 1250 according to the monitoring period. Each control information 1231, 1232, 1233 of a URLLC service indicates a corresponding resource preemption region 1241, 1242, 1243, respectively. Each PI 1251, 1252 can only indicate URLLC service scheduled according to control information, e.g. UL grant, transmitted at the same time as and before the PI transmission time. For example, the PI 1251 can only indicate URLLC service scheduled according to the control information 1231, but not URLLC service scheduled according to the control information 1232, 1233. As such, the PI 1251 indicates 100, because by the transmission time of the PI 1251, only the first user D1, not users D2, D3, is preempted.

The user or UE detects preemption information according to the configured monitoring period. After receiving the preemption information, the user cancels the transmission or stops the transmission of the uplink service. Optionally, for the configuration of UL PI monitoring, the user starts to detect the received PI after receiving the UL grant, and does not need to monitor the UL PI when the UL grant is not received. Optionally, if the RUR receiving the PI indication has a URLLC, the transmissions under PUSCH in the slot corresponding to the RUR are deemed to be canceled or stopped. Further, it is not necessary to monitor or receive the PI indicating the RUR after the RUR in the slot. That is, no other uplink transmission is scheduled by default in subsequent RUR even if there is no conflict. In one example, when the received subsequent PI indicates no conflict or no subsequent PI is received, the uplink transmission by default is not resumed. In another example, when the received subsequent PI indicates no conflict, the uplink transmission on PUSCH continues in the RUR without conflict.

In one embodiment, when the received UE-specific indication information uses 1 bit to indicate whether it is preempted, the uplink transmission is canceled or stopped; when the received UE-specific indication information uses more than 1 bit to indicate that some of the resources in the reference uplink resource region are preempted, the uplink transmission on the preempted portion of the reference uplink resource region is canceled or stopped, and the uplink transmission on the remaining non-preempted portion of the reference uplink resource region is still being sent. The uplink transmission may be resumed (that is, the preempted part is no longer sent, while continuing to send the part that is not preempted) or delayed (that is, the preempted part is delayed to the non-preempted resource for transmission, which means to the last part of the data is always preempted). In another example, when the received indication information uses 1 bit to indicate whether it is preempted, the uplink transmission is stopped and resumed after the RUR indicated by the PI. In another example, when the received indication information uses 1 bit to indicate whether it is preempted, the uplink transmission is stopped and delayed after the RUR indicated by the PI.

When the preemption information is group common information, the UE determines whether the notified resource range of the preemption indication conflicts with its own uplink service, and the transmission is canceled or stopped if the conflict exists. In one example, once the PI indication is detected after the UL grant, and whether or not there is a conflict, the original uplink transmission is canceled or stopped. In another example, once the PI indication is detected after the UL grant and there is a conflict with the scheduled uplink services, the original uplink transmission is cancelled or stopped and do not resume until the next UL grant is received or until next slot. There is no need to monitor or receive the PI until the next UL grant is received or until next slot.

In one embodiment, the condition for the UL PI to work is that the delay of the PI processing is less than the uplink scheduling delay of the URLLC, and the function is enabled when the condition is satisfied. Alternatively, the monitoring period is configurable. The unit of the monitoring period is slot, mini-slot, or symbol. Optionally, when the received PI indicates to cancel or stop the transmission, the PUSCH transmission is canceled or punctured when the PUSCH has not been transmitted, and the PUSCH transmission is stopped or punctured when it is being transmitted. The canceling and stopping may refer to cancel and stop the entire transmission, or merely cancel and stop the conflict portion of the transmission, where the non-conflicting portion is still transmitted.

In a fifth embodiment, the base station schedules the resource used by the URLLC uplink service with a short duration to preempt resources (including at least one of: PUSCH, PUCCH, and SRS) that have been allocated to the eMBB uplink service. The BS sends the preemption indication information to notify the terminal whose resources are preempted. After receiving the preemption indication information, the terminal determines to cancel or stop the uplink transmission based on the channel type.

The preemption indication information may indicate a configured reference uplink resource region, and indicate whether there is URLLC transmission in the reference uplink resource region or any sub-region of the reference uplink resource region, where the sub-regions are divided according to a certain granularity. The frequency domain corresponding to the reference uplink resource region is referred to as the active UL bandwidth part (BWP) of the terminal. The time domain corresponding to the reference uplink resource region is the region after the starting or ending symbol of the control resource set where the current preemption indication information is located, and its offset value and length are predefined or configured via a higher layer signaling.

For the reference uplink resource indicated by the PI, the offset value is a fixed value or a configured value, for example, 4 symbols, or 7 symbols, or m times the monitoring period, m is a positive integer; the length is equal to a fixed value, or a configured value, for example, n times the monitoring period and n is a positive integer.

The content indicated by the PI includes at least one of the following modes: (1) X bits for indicating whether each monitoring period in a Reference Uplink Resource (RUR) containing X monitoring periods is preempted; (2) 1 bit used to indicate whether RUR is preempted, that is, whether there is URLLC transmission; (3) N bits used to indicate, in a user group including N UEs, whether each UE needs to cancel or stop transmission; (4) 2X bits used to indicate whether a first half $\lceil B_{INT}/2 \rceil$ and a second half $\lfloor B_{INT}/2 \rfloor$ physical resource blocks (PRBs) in each monitoring period in a RUR containing X monitoring periods are preempted, where $B_{INT}$ is the number of PRBs included in the active UL BWP; (5) 2X bits used to indicate whether a first half $\lceil N_{INT}/2 \rceil$ and a second half $\lfloor N_{INT}/2 \rfloor$ symbols in each monitoring period in a RUR containing X monitoring periods are preempted, where $N_{INT}$ is the number of valid symbols included in the RUR; (6) 14 bits used to indicate whether the 14 resource sub-blocks in the RUR are preempted, where the 14 resource sub-blocks are RUR resources divided in a manner of 14*1 or 7*2 in accordance with a higher layer signaling configuration; and (7) Z bits used to indicate whether each type of channel or signal is preempted. The above description about modes (1)-(7) is for a single-carrier preemption indication. When multiple carriers are used, each carrier is independently indicated.

In one example, an independent PI indication is used for each channel/signal, i.e., each channel/signal uses one of modes (1)-(6) independently. Alternatively, the same PI indication mode is used for different types of channels/signals, while the channels/signals use different radio network temporary identifiers (RNTIs) to distinguish their PI information from each other.

After the terminal receives the PI (e.g., the PI is one of the above modes (1)-(6)), the corresponding UE behavior is determined according to a predefined or a higher layer configuration. For example, when the RUR is indicated by the received PI indication to have URLLC, it is deemed that transmissions of all types of channels/signals (the PUCCH, PUSCH, SRS, etc.) included in the RUR are to be canceled or stopped. In another example, part of the resources in the RUR are preempted according to the PI, then transmission of all the uplink channels/signals are canceled or stopped in the preempted resources, while the transmission in other non-preempted resource will be sent. In another example, when at least part of the resources in the RUR is preempted according to the PI, PUSCH transmission is canceled or stopped while PUCCH transmission continues; or PUSCH transmission is canceled or stopped while SRS transmission continues. In another example, when the RUR is indicated by the received PI indication to have URLLC, it is deemed that transmissions of all types of channels/signals (the PUCCH, PUSCH, SRS, etc.) included in the slot corresponding to the RUR are to be canceled or stopped. In addition, it is not necessary to monitor or receive the PI indicating the RUR after the RUR in the slot. That is, no other uplink transmission is scheduled by default in subsequent RUR even if there is no conflict. In one example, when the received subsequent PI indicates no conflict or no subsequent PI is received, the uplink transmission by default is not resumed. In another example, when the received subsequent PI indicates no conflict, the uplink transmission on PUSCH, PUCCH, and/or SRS continues in the RUR without conflict.

In one embodiment, when the received indication information uses 1 bit to indicate whether it is preempted, the uplink transmission is canceled or stopped; when the received indication information uses more than 1 bit to indicate that some of the resources in the reference uplink resource region are preempted, the uplink transmission on the preempted portion of the reference uplink resource region is canceled or stopped, and the uplink transmission on the remaining non-preempted portion of the reference uplink resource region is still being sent. The uplink transmission may be resumed (that is, the preempted part is no longer sent, while continuing to send the part that is not preempted) or delayed (that is, the preempted part is delayed to the non-preempted resource for transmission, which means to the last part of the data is always preempted). In another example, when the received indication information uses 1 bit to indicate whether it is preempted, the uplink transmission is stopped and resumed after the RUR indicated by the PI. In another example, when the received indication information uses 1 bit to indicate whether it is preempted, the uplink transmission is stopped and delayed after the RUR indicated by the PI.

When the preemption information is UE-specific information, the transmission is canceled or stopped when it is received. When the preemption information is group common information, the UE determines whether the notified resource range of the preemption indication conflicts with its own uplink service, and the transmission is canceled or stopped if the conflict exists. In one example, once the PI indication is detected after the UL grant, and whether or not there is a conflict, the original uplink transmission is canceled or stopped. In another example, once the PI indication is detected after the UL grant and there is a conflict with the scheduled uplink services, the original uplink transmission is cancelled or stopped and do not resume until the next UL grant is received or until next slot. There is no need to monitor or receive the PI until the next UL grant is received or until next slot.

In one embodiment, the condition for the UL PI to work is that the delay of the PI processing is less than the uplink scheduling delay of the URLLC, and the function is enabled when the condition is satisfied. Alternatively, the monitoring period is configurable. The unit of the monitoring period is slot, mini-slot, or symbol. Optionally, when the received PI indicates to cancel or stop the transmission, the PUSCH transmission is canceled or punctured when the PUSCH has not been transmitted, and the PUSCH transmission is stopped or punctured when it is being transmitted. The canceling and stopping may refer to cancel and stop the entire transmission, or merely cancel and stop the conflict portion of the transmission, where the non-conflicting portion is still transmitted.

In a sixth embodiment, based on at least one of the foregoing five embodiments, the PUSCH of the preempted user is transmitted in a manner of slot aggregation. When the received PI indicates that there is a preempted transmission in a portion of the aggregated slots, the UE behavior includes at least one of the following: when the received PI indicates that a resource is preempted and conflicts with the PUSCH in the portion of the aggregated slots, all PUSCH transmitted in the manner of slot aggregation are cancelled or stopped; when the received PI indicates that a resource is preempted and conflicts with the PUSCH in the portion of the aggregated slots, the conflicting slot(s) cancel or stop transmission, and the remaining non-conflicting slot(s) can still transmit the PUSCH. In one example, when the cancelled or stopped slot was scheduled to transmit the redundancy version RV0, then the preempted RV0 will be transmitted later. In another example, when the cancelled or stopped slot was scheduled to transmit other redundancy versions (such as RV1, RV2, and RV3), then the UE will continue to transmit the redundancy versions that are not preempted. In one example, when the cancelled or stopped slot was scheduled to transmit the redundancy version RV0 or RV3, then the preempted RV0 or RV3 will be transmitted later. In another example, when the cancelled or stopped slot was scheduled to transmit other redundancy versions (such as RV1 or RV2), then the UE will continue to transmit the redundancy versions that are not preempted.

In one example, based on at least one of the foregoing five embodiments, when the RNTI corresponding to the PI information is configured with more than one value by a higher layer signaling, different RNTI values have different meanings, based on at least one of the following: when two or more RNTI values are configured, the first value indicates that transmissions of the uplink services are all canceled or stopped, and the second value indicates that only the conflicting transmission of the uplink services will be canceled or stopped; when two or more RNTI values are configured, the first value indicates that all uplink channels/signals are cancelled or stopped, and the second value indicates that only transmission on the PUSCH is cancelled or stopped.

Figure 13:
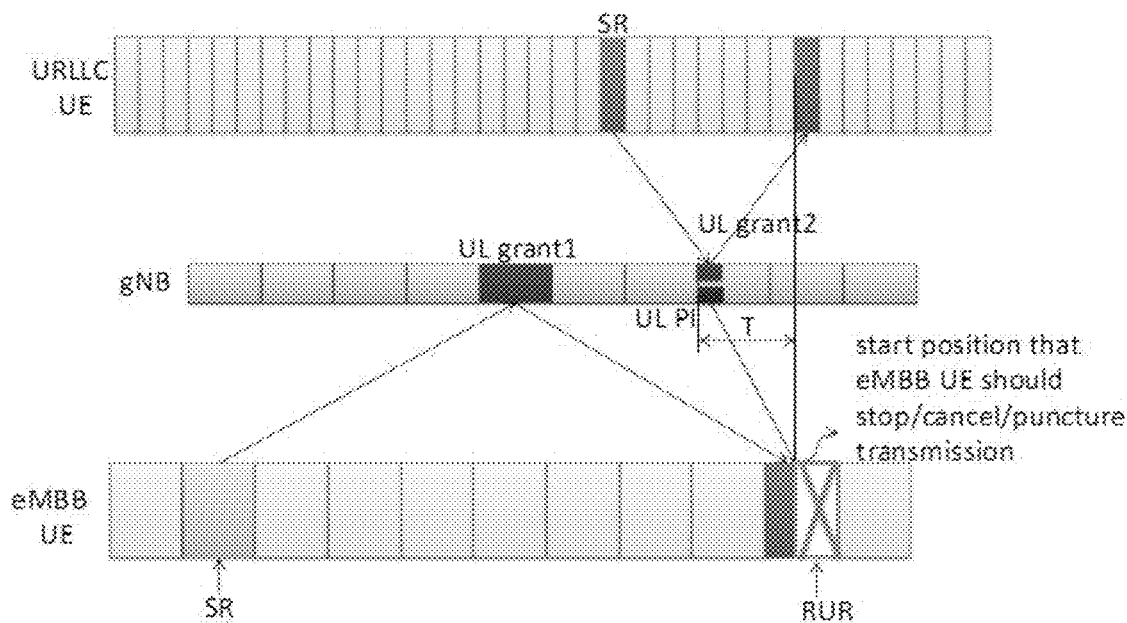
FIG. 13 illustrates exemplary time duration and reference uplink resource for indicating uplink resource preemption, in accordance with an embodiment of the present disclosure.

In another embodiment, uplink (UL) multiplexing is used between different UEs. In this embodiment, a UE, e.g. the eMBB UE, stops or cancels or punctures its uplink transmission when an UL preemption indicator (UL PI) is detected. For the UL PI based solution, two basic concepts are defined. The first one is the time duration (denoted as "T") from a time point when the UL PI is transmitted (starting or ending symbol where the UL PI located) to a time point when the UE stops or cancels or punctures its transmission. The other one is the resource regions on which the UE does not transmit, which is referred as reference uplink resource (RUR), similar to the reference downlink resource (RDR). FIG. 13 provides an illustration of the above mentioned definitions.

The processing timeline for URLLC UE and eMBB UE may be significantly different. In order to make the UL PI mechanism workable, the T should be as small as possible. In one example, T is equal or smaller than the time between the UL grant transmission and PUSCH transmission for URLLC UE. If the TAs for both eMBB UE and URLLC UE are taken into account (not illustrated in FIG. 13), the T may be even smaller. It may be a great challenge for eMBB UEs to process the UL PI in such a short time. Of course, there may not be a concern for UEs which support both eMBB and URLLC, but there are still some other UEs that can only support eMBB. For those UEs, there may not be enough time for them to process the UL PI before they can stop/cancel/puncture their PUSCH transmissions.

There are mainly two different manners for signaling the T and RUR. In a first manner (M-1): both T and RUR are configured or predefined at a higher layer. In a second manner (M-2): T and/or RUR are indicated dynamically. For M-2, the time duration and the RUR can be more flexibly indicated at the cost of higher DCI overhead. In one embodiment, such flexibility seems not so necessary, and M-1 is preferred.

More design considerations (M 1-1 and M 1-2) are provided for M-1 below. The relationship between the UE monitoring periodicity (P) and the time granularity of RUR (RUR_T) may affect design of the UL PI.

M 1-1: P<RUR_T. As shown in FIG. 14, the UE monitoring periodicity for UL PI is on mini-slot basic, i.e., P=1 mini_slot. Because the eMBB transmission is general on a slot basic, the time domain of RUR is defined as the whole slot where the UE should response to the UL PI. RUR does not cross slot. That is, RUR_T=1 slot. Further, depending on whether gNB can predict the scheduling for URLLC or not, the UL PI may be different.

In one example, assuming the UL PI is 1 bit per UE, Table-1 below gives an example of the UL PI to be transmitted. As shown in Table-1, the UL PI should be set to "100" for UE1, UE2 and UE3 respectively when transmitted on t1, and should be set to "111" when sent on t2 for the case that gNB is not able to predict the later scheduling of URLLC in the moment that it sends UL PI. That is, the UL PI for UE 2 and UE3 will change in different PI transmission opportunities and the later one should override the previous one. This makes the UEs keep monitoring the UL PI in every PI transmission occasions until it receives an UL PI indicating "1". The UE should stop its whole or remaining PUSCH transmission if it receives an UL PI indicating "1".

TABLE 1

| | Per-UE basic UL PI | | | | | |
| --- | --- | --- | --- | --- | --- | --- |
| | gNB without prediction | | | gNB with prediction | | |
| | UE1 | UE2 | UE3 | UE1 | UE2 | UE3 |
| t1 | 1 | 0 | 0 | 1 | 1 | 1 |
| t2 | 1 | 1 | 1 | 1 | 1 | 1 |

If the gNB can predict the scheduling of URLLC in the whole slot, the UL PI should be set to "111" when both transmitted on t1 and t2. It is up to gNB's implementation whether to transmit the UL PI on occasions other than t1. Multiple UL PI transmissions may do some help in case of UL PI miss-detection. For example, if UE2 misses the UL PI in t1 but receives the UL PI in t2, it can still stop its PUSCH transmission no later than t4, which makes no effect on the UE5's URLLC PUSCH transmission. But it is not the case for UE1. If UE1 misses the UL PI in t1 and receives the UL PI in t2, UE1 will not stop its transmission in t3. Therefore, it will affect the URLLC transmission of UE4. In this case, a UE may not need to keep monitoring the UL PI on every PI transmission occasions once it has received an UL PI indicating "1". In this case, the UE stops its whole or remaining PUSCH transmission if it receives an UL PI indicating "1".

Figure 15:
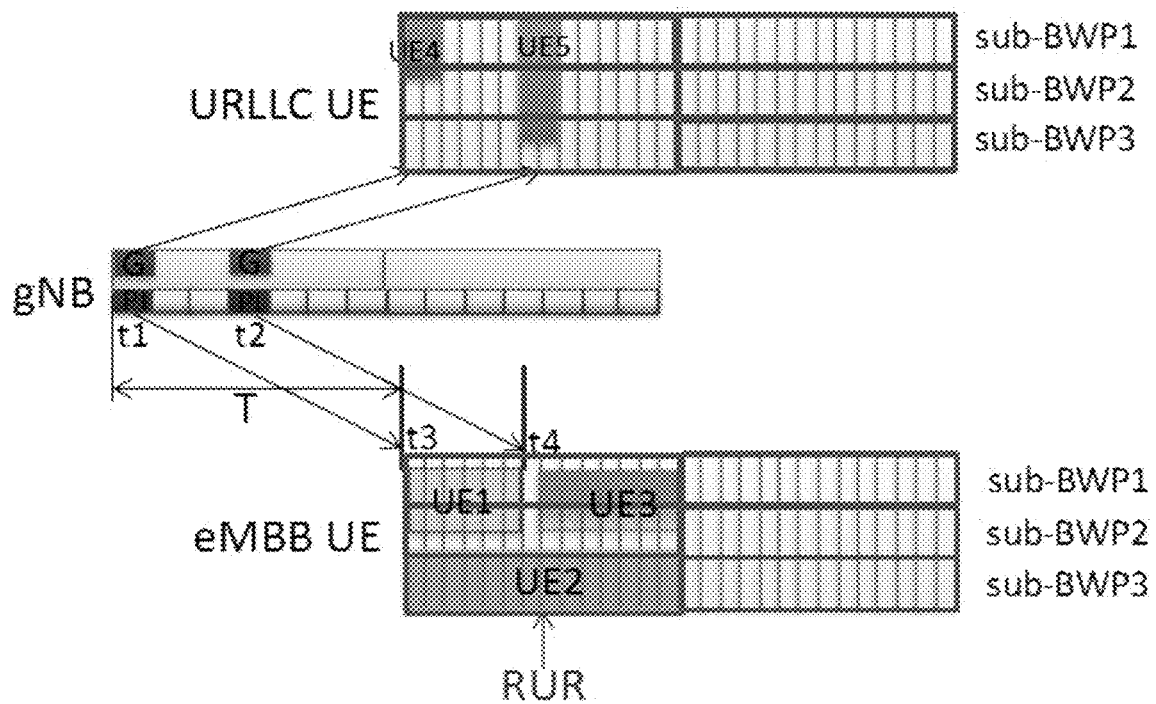
FIG. 15 illustrates another exemplary uplink preemption indicator for indicating uplink resource preemption, in accordance with an embodiment of the present disclosure.

The above mentioned examples for UL PI are on per-UE basic. There may be other format design for the UL PI. It can be designed in a similar way as DL PI. That is, the gNB can divide the RUR into X sub-blocks and use X bits to indicate whether and where will be URLLC transmission in the corresponding sub-block. FIG. 15 provides an example under this setup.

In an example, assuming the RUR is divided into 3 sub-BWPs in the frequency domain and 3 bits are used to indicate whether there will be URLLC transmission for 3 sub-BWPs by bitmap. Table-2 below provides an example of the UL PI to be transmitted. As shown in Table-2, the UL PI should be set to "110" for sub-BWP1, sub-BWP2 and sub-BWP3 respectively when transmitted on t1, and should be set to "111" when sent on t2 for the case that gNB is not able to predict the later scheduling of URLLC in the moment that it sends UL PI. That is, the UL PI for sub-BWP2 and sub-BWP3 will change in different PI transmission opportunities and the later one should override the previous one. This makes the UEs keep monitoring the UL PI in every PI transmission occasions.

TABLE 2

Sub-block basic UL PI

| | gNB without prediction | | | gNB with prediction | | |
|---|---|---|---|---|---|---|
| | sub-BWP1 | sub-BWP2 | sub-BWP3 | sub-BWP1 | sub-BWP2 | sub-BWP3 |
| t1 | 1 | 1 | 0 | 1 | 1 | 1 |
| t2 | 1 | 1 | 1 | 1 | 1 | 1 |

If the gNB can predict the scheduling of URLLC in the whole slot, the UL PI should be set to "111" when both transmitted on t1 and t2. In this case, for UE2, it should stop its PUSCH transmission in t3 if it received the UL PI sent on t1 even if there is no collision happened during t3 to t4. This is because the time domain granularity of the PI is too large. Therefore, in this case, the time domain of RUR can also be divided into sub-slots. For example, similar to DL PI, an N×M bitmap can be used to indicate whether there is URLLC transmission in each sub-block. In this case, the UE should stop the transmission on the sub-blocks with UL PI indicating "1". This is suitable for the UEs which have no difficulty for non-continuous transmission within a slot. If the UEs are not able to perform such operation, there is no need to indicate the puncturing in such a finer time granularity.

Figure 16:
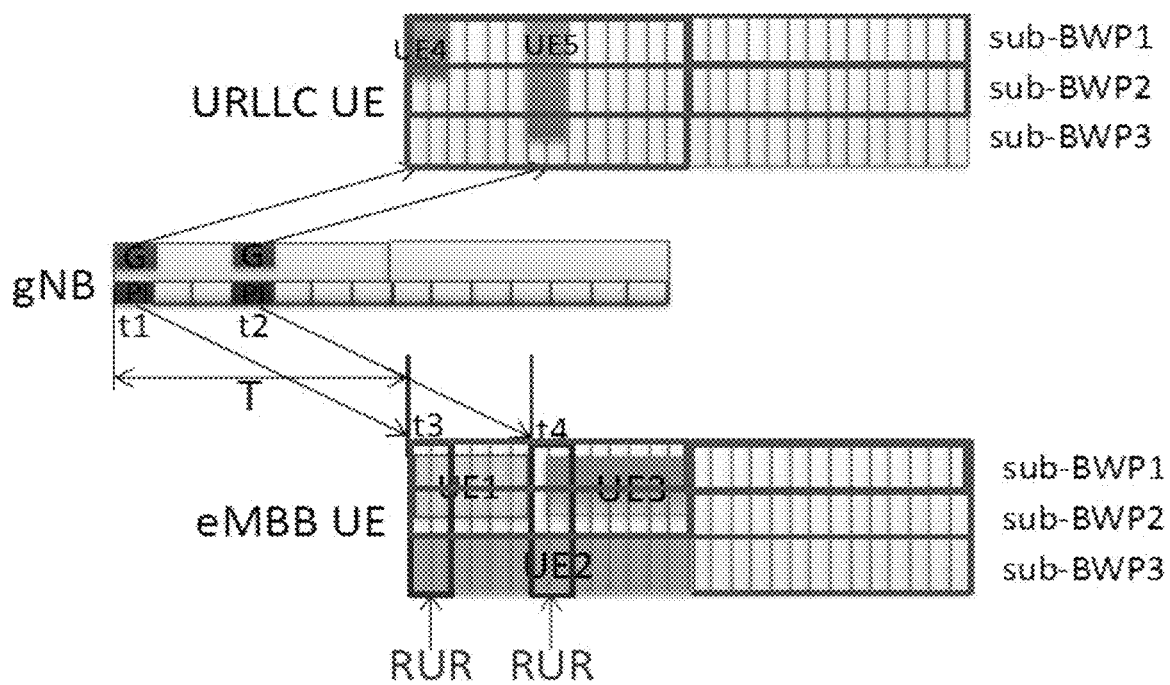
FIG. 16 illustrates yet another exemplary uplink preemption indicator for indicating uplink resource preemption, in accordance with an embodiment of the present disclosure.

M 1-2: P=RUR_T. As shown in FIG. 16, both the UE monitoring periodicity for UL PI and RUR_T are on mini-slot basic. In this case, it is better to set the UE monitoring periodicity same as the scheduling granularity of URLLC. In this way, no scheduling prediction is required from the gNB side. Considering the time domain of the RUR is relatively small, it may be enough for the UL PI to only indicate the collision in frequency domain.

In that sense, both per-UE based indication and sub-block based (in frequency domain) indication are possible. Table-3 below provides an example UL PI to be sent for both per-UE based indication and sub-block indication.

TABLE 3

Per-UE and sub-block UL PI

| | Per-UE indication | | | sub-block indication | | |
|---|---|---|---|---|---|---|
| | UE1 | UE2 | UE3 | sub-BWP1 | sub-BWP2 | sub-BWP3 |
| t1 | 1 | 0 | 0 | 1 | 1 | 0 |
| t2 | 0 | 1 | 1 | 1 | 1 | 1 |

In this case, the UEs only need to drop the transmission on the colliding time domain symbols which indicated by the UL PI. Puncturing or delaying the transmission should also be considered for transmission on the colliding time domain symbols. Depending on UE ability on non-continuous transmission within a slot, the UL PI may be as below.

In case UE ability on non-continuous transmission within a slot is supported, P=RUR_T, and should also be equal to the time domain scheduling granularity of URLLC. Both per-UE based and sub-block based PI can be considered. For per UE based. one preemption bit is for one UE; for sub-block based, one preemption bit is for one sub-block (in frequency domain only).

In case UE ability on non-continuous transmission within a slot is not supported, P<RUR_T. Per-UE based PI is more preferred. The UL PI may change in different transmission occasions.

Through the information indication methods described in the above embodiments, by determining the reference uplink resource region indicated by the indication information, an uplink transmission that has been scheduled may be cancelled or stopped based on the indication, which enables low-delay and high-reliability services to be transmitted in the resource region and avoids interference from preempted user transmission signals, ensuring low-delay and high-reliability service performance.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

We claim:

1. A method performed by a wireless communication device, the method comprising:
   receiving indication information, wherein the indication information indicates that a first resource region is at least partially preempted;
   identifying the first resource region based on an offset value of the first resource region and a length of the first resource region; and
   cancelling or stopping or puncturing an uplink transmission based on the indication information;
   wherein the offset value is determined based on a first value configured by a higher layer signaling, and the offset value represents a number of symbols from an ending symbol of a control resource set where the indication information is located, and
   wherein the length is determined based on a second value configured by the higher layer signaling, and the second value is an integral multiple of a monitoring period of the indication information.

2. The method of claim 1, wherein the uplink transmission includes data transmission based on at least one of: a physical uplink shared channel (PUSCH); a physical uplink control channel (PUCCH); or a sounding reference signal (SRS).

3. The method of claim 1, wherein
the first resource region is at least partially preempted by a preempting uplink transmission;
the offset value is not greater than a scheduling delay of the preempting uplink transmission; and
the scheduling delay of the preempting uplink transmission is not smaller than at least one of:
a processing delay of the indication information, or
a sum of the processing delay and a timing advance (TA), wherein the TA is at least one of: a TA of the wireless communication device, or a maximum TA of a group of wireless communication devices including the wireless communication device.

4. The method of claim 1, wherein the indication information comprises at least one of:
a first quantity of bits each of which indicates whether a corresponding monitoring period in the first resource region including the first quantity of monitoring periods is preempted; or
a second quantity of bits each of which indicates whether an uplink transmission from a corresponding one of the second quantity of a group of wireless communication devices is preempted.

5. The method of claim 1, wherein the uplink transmission was scheduled or configured on a second resource region conflicted with the first resource region.

6. The method of claim 5, further comprising at least one of:
starting to detect indication information in response to a received uplink (UL) grant;
cancelling or stopping or puncturing the uplink transmission in response to a conflict between the first resource region and the second resource region;
cancelling or stopping the uplink transmission regardless of whether there is a conflict between the first resource region and the second resource region;
stopping the uplink transmission and resuming after the preempted resources;
stopping the uplink transmission and delaying after the preempted resources;
stopping detecting subsequent indication information until next received UL grant;
cancelling uplink transmissions in a slot where the first resource region is located;
stopping detecting subsequent indication information indicating a resource region that is subsequent to the first resource region within the slot; or
resuming the uplink transmission in the slot in response to subsequent indication information indicating a preempted resource region that has no conflict with the uplink transmission.

7. The method of claim 5, wherein:
the uplink transmission was scheduled to be transmitted in a manner of slot aggregation on the second resource region that includes a plurality of slots;
the plurality of slots incudes at least one preempted slot; and the method further comprises:
determining a first redundancy version scheduled in the at least one preempted slot according to the slot aggregation,
transmitting the first redundancy version after the at least one preempted slot based on that the first redundancy version is redundancy version 0 (RV0), and
transmitting a second redundancy version after the at least one preempted slot based on original redundancy version pattern.

8. A method performed by a wireless communication node, the method comprising:
transmitting indication information, wherein
the indication information indicates that a first resource region is at least partially preempted,
the first resource region is identified based on an offset value of the first resource region and a length of the first resource region, and
an uplink transmission is to be cancelled or stopped or punctured based on the indication information,
wherein the offset value is determined based on a first value configured by a higher layer signaling, and the offset value represents a number of symbols from an ending symbol of a control resource set where the indication information is located, and
wherein the length is determined based on a second value configured by the higher layer signaling, and the second value is an integral multiple of a monitoring period of the indication information.

9. The method of claim 8, wherein the uplink transmission includes data transmission based on at least one of: a physical uplink shared channel (PUSCH); a physical uplink control channel (PUCCH); or a sounding reference signal (SRS).

10. The method of claim 8, wherein
the first resource region is at least partially preempted by a preempting uplink transmission;
the offset value is not greater than a scheduling delay of the preempting uplink transmission; and
the scheduling delay of the preempting uplink transmission is not smaller than at least one of:
a processing delay of the indication information, or
a sum of the processing delay and a timing advance (TA), wherein the TA is at least one of: a TA of the wireless communication device, or a maximum TA of a group of wireless communication devices including the wireless communication device.

11. The method of claim 8, wherein the indication information comprises at least one of:
a first quantity of bits each of which indicates whether a corresponding monitoring period in the first resource region including the first quantity of monitoring periods is preempted; or
a second quantity of bits each of which indicates whether an uplink transmission from a corresponding one of the second quantity of a group of wireless communication devices is preempted.

12. The method of claim 8, wherein the uplink transmission was scheduled or configured on a second resource region conflicted with the first resource region.

13. A wireless communication device, comprising:
at least one processor configured to:
receive indication information, wherein the indication information indicates that a first resource region is at least partially preempted;
identify the first resource region based on an offset value of the first resource region and a length of the first resource region; and cancel or stop or puncture an uplink transmission based on the indication information;

wherein the offset value is determined based on a first value configured by a higher layer signaling, and the offset value represents a number of symbols from an ending symbol of a control resource set where the indication information is located, and wherein the length is determined based on a second value configured by the higher layer signaling, and the second value is an integral multiple of a monitoring period of the indication information.

14. A wireless communication node, comprising:

at least one processor configured to:

transmit indication information, wherein the indication information indicates that a first resource region is at least partially preempted, the first resource region is identified based on an offset value of the first resource region and a length of the first resource region, and an uplink transmission is to be cancelled or stopped or punctured based on the indication information, wherein the offset value is determined based on a first value configured by a higher layer signaling, and the offset value represents a number of symbols from an ending symbol of a control resource set where the indication information is located, and wherein the length is determined based on a second value configured by the higher layer signaling, and the second value is an integral multiple of a monitoring period of the indication information.

\* \* \* \* \*